US012151356B2

(12) United States Patent
Lehr et al.

(10) Patent No.: US 12,151,356 B2
(45) Date of Patent: Nov. 26, 2024

(54) DEVICE HEAD OF A HYDRAULICALLY ACTUATABLE TOOL

(71) Applicant: GUSTAV KLAUKE GMBH, Remscheid (DE)

(72) Inventors: Andreas Lehr, Neuss (DE); Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 102 days.

(21) Appl. No.: 17/754,496

(22) PCT Filed: Oct. 8, 2020

(86) PCT No.: PCT/EP2020/078276
§ 371 (c)(1),
(2) Date: Apr. 4, 2022

(87) PCT Pub. No.: WO2021/069587
PCT Pub. Date: Apr. 15, 2021

(65) Prior Publication Data
US 2023/0405788 A1 Dec. 21, 2023

(30) Foreign Application Priority Data
Oct. 11, 2019 (DE) ......................... 102019127497.4

(51) Int. Cl.
*B25F 5/00* (2006.01)
*B21D 39/04* (2006.01)
(Continued)

(52) U.S. Cl.
CPC ............ *B25F 5/005* (2013.01); *B21D 39/048* (2013.01); *B25F 5/02* (2013.01); *B25B 27/026* (2013.01)

(58) Field of Classification Search
CPC ..... B25B 27/10; B25B 27/026; B25B 27/146; B25F 5/02; B25F 5/026; F16L 13/141; H01R 43/0427; H01R 43/0428
See application file for complete search history.

(56) References Cited

U.S. PATENT DOCUMENTS 2,968,202 A * 1/1961 Evans ................ H01R 43/0427 81/301
3,326,029 A * 6/1967 Porter ................ H01R 43/0427 72/445
(Continued)

FOREIGN PATENT DOCUMENTS

EP 1084798 B1 6/2009
EP 1519813 B1 5/2012

OTHER PUBLICATIONS

International Search Report for PCT/EP2020/078276 dated Feb. 1, 2021.
(Continued)

*Primary Examiner* — Tyrone V Hall, Jr.
(74) *Attorney, Agent, or Firm* — Klintworth & Rozenblat IP LLP

(57) ABSTRACT

A device head of a hydraulically actuatable tool includes an opposing holder which is integrally formed on the device head and which receives a first tool, and including a second tool that can be moved towards the opposing holder by a hydraulic piston. A cylindrical formation formed integrally with the device head and is provided relative to the hydraulic piston. The device head has an integrally formed toothing recess for the angular fixed, but also changeable, arrangement of a retaining rod.

17 Claims, 16 Drawing Sheets

(51) Int. Cl.
*B25B 27/02* (2006.01)
*B25F 5/02* (2006.01)

(56) References Cited

U.S. PATENT DOCUMENTS

| | | | | | |
|---|---|---|---|---|---|
| 5,062,290 | A * | 11/1991 | Hoover | H01R 43/0427 100/231 |
| 5,337,566 | A * | 8/1994 | Lomastro | H01R 43/0427 60/632 |
| 6,718,870 | B1 | 4/2004 | Frenken | |
| 7,254,982 | B2 | 8/2007 | Frenken | |
| 2016/0325424 | A1 * | 11/2016 | Bevins, Jr. | H02G 1/02 |
| 2016/0344170 | A1 | 11/2016 | Tamm | |
| 2017/0087709 | A1 * | 3/2017 | Barezzani | B25B 27/146 |

OTHER PUBLICATIONS

Machine Translation of EP1084798.
Machine Translation for EP1519813.

* cited by examiner

DEVICE HEAD OF A HYDRAULICALLY ACTUATABLE TOOL

FIELD OF TECHNOLOGY

The invention relates to a device head of a hydraulically actuatable tool, comprising a counter holder, which is formed integrally in one piece on the device head and which has a receptacle for a first tool, and a second tool, which can be moved towards the counter holder by means of a hydraulic piston, wherein a cylindrical formation likewise integrally in one piece with the device head with respect to the hydraulic piston is provided.

PRIOR ART

Device heads of the type in question are known in various embodiments. In combination with a hydraulic drive, they serve, for example, to press, cut, or punch workpieces, for the purpose of which corresponding first and second tools are to be arranged in the device head or on the hydraulic piston, respectively. Reference is made, for example, to EP1084798 B1 (U.S. Pat. No. 6,718,870 B1).

It is furthermore known to form the device head essentially integrally in one piece and of uniform material, thus having the counter holder integrally in one piece and a cylindrical formation for directly or indirectly receiving and guiding the hydraulic cylinder.

SUMMARY OF THE INVENTION

With regard to the above-described prior art, the object is to design a device head of the type in question comprising a second tool, which can be moved by means of a hydraulic piston, in a manner, which is further improved with regard to handling.

According to a first idea of the invention, a possible solution of the object is given in the case of a device head, whereby the focus is on that the second tool can be moved between an initial position and an operating end position by means of the hydraulic piston, that the hydraulic piston can act on a piston shaft, which is formed in one piece with a receptacle for the second tool, and that the piston shaft can be received completely in the cylindrical formation in the initial position.

The operating end position has to thereby not mandatorily be the, optionally stop-limited, maximally reachable end position of the hydraulic piston. On the contrary, the operating end position can be the displacement position of the hydraulic piston, in which a measure to be carried out is carried out by using the tools according to specification. From this reached operating end position, the hydraulic piston can move back in the direction of the initial position, optionally automatically as a result of a valve opening carried out in the hydraulic system.

The receptacle for the second tool can, as preferred, be formed in one piece and further preferably of uniform material, with a piston shaft, on which the hydraulic piston can preferably act. This further offers production and assembly-related advantages.

The hydraulic piston, as further preferred, can thereby be provided so as not to be connected to the piston shaft or, in the alternative, so as to be detachably connected to the piston shaft.

By means of the preferably complete reception of the piston shaft in the cylindrical formation, this also in the initial position, the piston shaft is protected from direct damages from the outside, for example during a device head change or during a storage of the device head.

In the case of preferably one-piece formation of the device head and further one-piece formation of piston shaft and receptacle for the second tool, a removal of the tool receptacle comprising the piston shaft is possible in an advantageous manner, for example through the device jaw remaining between the counter holder of the device head and the cylindrical formation.

According to a further idea of the invention, a solution of the task can also be given in the case of a device head, whereby the focus is on that the device head further has a toothing recess formed integrally in one piece for the angularly fixed, but changeable arrangement of a retaining rod.

For example, a use of the device head by the user at a distance from the body is made possible by using such a retaining rod. In addition or in the alternative, the device head can be stabilized in an operating position by using the retaining rod. Operations, for example overhead, in any case at least at a distance of, for example, 1 meter or more, can thus be made possible by means of the retaining rod. In particular the device head, but optionally also the hydraulic unit acting on the hydraulic cylinder, is thereby no longer held directly or solely by hand, but on the contrary, in any case additionally, via the retaining rod.

The retaining rod can have a fixed length of, for example, 0.5 meters, 1 meter, 2 meters, up to, for example, 3 meters, whereby each intermediate dimension, for example between 0.5 and 3 meters, can also be given as fixed length. In a possible design, the retaining rod can also be formed in a settable manner with regard to its length, for example as a result of a telescopic embodiment, thus for example with a telescopic length of 0.5 to 2 meters.

The handling via the retaining rod is promoted as a result of the provided toothing external molding on the device head. This provides for an angularly, fixed arrangement of the retaining rod relative to a longitudinal central axis of the device head, which longitudinal central axis can receive, optionally simultaneously, the axis of rotation of the hydraulic cylinder or of the hydraulic piston, respectively. This angular arrangement of the retaining rod can preferably be changed, for the purpose of which a positive connection provided via the toothing recess can be temporarily cancelled.

The toothing recess, which is formed integrally in one piece, can have toothing protrusions, which are raised compared to the surrounding surface of the device head, optionally only one such toothing protrusion, or in the alternative toothing recesses, which return compared to the above-described surface of the device head, optionally also only one toothing recess.

According to a further idea of the invention, one solution of the task can be given in the case of a device head, whereby the focus is on that the second tool can be moved between an initial position and an operating end position by means of the hydraulic piston, that the piston shaft has a receptacle, which, compared to the piston shaft, is enlarged transversely to a direction of movement of the hydraulic piston and which is assigned to the second tool, and that in the operating end position the receptacle is held transversely to the direction of movement in an undercut formed on the device head.

The receptacle, which can be displaced in the direction of movement by means of the piston shaft, can, as preferred, be formed for retaining the second tool, further preferably for retaining a replaceable second tool. This receptacle thereby extends beyond the jacket surface of the piston shaft at least in a direction transversely to the direction of movement, wherein the enlargement of the receptacle compared to the piston shaft can be given in this regard at least over a subsection of the circumference of the piston shaft, viewed with respect to a longitudinal axis of the piston shaft. Further with respect to a longitudinal axis of the piston shaft, which is directed in the direction of movement, enlargement sections located essentially diametrically, can thus form the receptacle for the second tool. Over the entire circumference of the piston shaft, the receptacle can further, for example, also extend beyond the jacket surface thereof.

Relatively large forces act in particular on this receptacle for the second tool, in particular in the operating end position, but furthermore optionally also in intermediate positions between the initial position and the operating end position. In order to counteract a possible tilting of the receptacle with the second tool here, the receptacle is held in an undercut. This undercut preferably acts in a direction transversely to the direction of movement of the receptacle for the second tool. An improved operating result, for example pressing or cutting result, can be achieved thereby in an advantageous manner.

To form the undercut, the receptacle can have, for example, a protrusion region, which is overlapped in a direction transversely to the direction of movement of the receptacle by means of an overlap section of the device head. In the alternative, the receptacle can also have an underlap section, and the device head a protrusion region cooperating in this way. In particular the receptacle, but furthermore optionally also the piston shaft connected to the receptacle, thereby experiences a guidance, in particular in the operating end position, as well as a movement hindrance in a direction transversely to the direction of movement.

Further features of the invention are described below, also in the figure description, often in their preferred assignment to the subject matter of claim 1 or of claim 2 or of claim 5 or to features of further claims. They can also be significant, however, in an assignment to only individual features of claim 1 or of claim 2 or of claim 5 or of the respective further claim or in each case independently.

Viewed in a longitudinal cross section of the device head, in which longitudinal cross section an axis of rotation of the hydraulic piston presents itself as a line, the toothing recess can be formed in a laterally offset manner, but in overlap to the cylindrical formation. The overlap can thereby result in the radial direction with respect to the hydraulic piston axis. This overlap can thereby further result in a piston shaft region, this further optionally in an initial position as well as in an operating end position of the hydraulic piston.

In the region of the toothing recess, the cylindrical formation can thus transition into a leg, which is molded so as to be reduced in thickness compared to the diameter dimension of the cylindrical formation integrally and in one piece with the cylindrical formation. In extension, this leg can furthermore carry the counter holder essentially co-directionally to the hydraulic piston axis.

With respect to a central through opening, for example for the passage of a clamping means, further for example of a clamping screw, the toothing recess can be formed concentrically circumferentially. If several toothing protrusions or toothing depressions of the toothing recess are provided, they are preferably positioned altogether in a circular or circular segment-shaped manner with respect to the geometrical central axis of the passage opening.

In the case of arrangement of several toothing protrusions or toothing depressions of the toothing recess, they can also be provided so as to be evenly spaced to one another in the circumferential direction, based on the geometrical central axis of the passage opening.

The receptacle for the second tool can, as preferred, be formed in one piece with the piston shaft, on which the hydraulic piston can preferably act, and further preferably of uniform material. This further offers production and assembly-related advantages. The hydraulic piston, as further preferred, can thereby be provided so as not to be connected to the piston shaft or, in the alternative, so as to be detachably connected to the piston shaft.

As a result of this design, the receptacle, together with the piston shaft, can be inserted into the device head in one-piece formation as part of the assembly or can be removed from the device head, respectively, as part of a disassembly.

In the initial position, which can preferably correspond to a basic position of the device head, which is unloaded by the hydraulic piston, the receptacle can, for this purpose, further be displaceable transversely to the direction of movement for the assembly and disassembly. This can further in particular be attained in that the undercut, which is preferably provided in the operating end position, with the device head is not provided or can be overcome in this initial position. In preferred design, this undercut and the guidance resulting therefrom as well as the protection against rotation and tilting is attained only with a displacement of the receptacle from the initial position in the direction of the operating end position.

By means of the displaceability of the receptacle in a direction transversely to the direction of movement, which is made possible thereby, a favorable assembly or disassembly, respectively, in particular of a receptacle, which is formed in one piece with the piston shaft, is made possible, in that said receptacle can be moved into the cylindrical formation as a result of the enabled tiltability as part of the assembly or can be moved out of the cylindrical formation, respectively, during a disassembly.

In further design, the device head can be connected to a hydraulic hose, which, for the free movability of the device head as compared to a hydraulic aggregate generating a hydraulic pressure, can be connected to the hydraulic aggregate on the other end. The hydraulic hose can thereby have a length, which allows moving the device head approximately freely, while the hydraulic aggregate, as preferred, is placed onto a floor or, for example, at table height. The arrangement of the retaining rod lends itself in particular in the case of such a configuration. This configuration allows, for example, an overhead use of the device head, further in particular a use, which is to take place at a distance of, for example, one to two meters or more to the user.

The device head can also be rigidly connected to a body casting tool part is known, for example, from EP 1519813 B1 (U.S. Pat. No. 7,254,982 B2). The content of this patent specification is hereby included in its entirety in the disclosure of the present invention, also for the purpose of including features of this patent in claims of the present invention.

The body casting tool part can simultaneously be used as handle for guiding the device head by the user. In the case of arrangement of the body casting tool part, the arrangement of the retaining rod or the use of an arranged retaining rod on the device head, respectively, can be forgone. It is also possible, however, to optionally additionally hold or to guide, respectively, the combined and rigid arrangement of device head and body casting tool part via the provided retaining rod.

In the initial position, the hydraulic piston can thereby be received completely in the cylindrical formation. The hydraulic piston or parts of the hydraulic piston thus preferably do not protrude beyond the cylindrical formation, optionally the hydraulic cylinder formed thereby, in the axial direction. This provides advantages, for example in the case of a device head, which is not connected to a hydraulic hose or a body casting tool part, thus for example as part of a device head change or a storage of the device head. A damage to the hydraulic piston or parts of the hydraulic piston as a result of a free protrusion beyond the end of the cylindrical formation is counteracted by means of the design according to the invention.

Based on the initial position of the hydraulic piston in continuation of a direction of movement of the hydraulic piston from the operating end position into the initial position or in the direction of extension of a hydraulic piston axis of rotation outside of the region surrounding the hydraulic piston, respectively, the cylindrical formation can also have a connector receptacle for the body casting tool part or the hydraulic hose. The connector receptacle is thus spaced apart from the hydraulic piston in the axial direction or direction of movement, respectively, of the hydraulic piston, this preferably in the initial position as well as in the operating end position as well as in every position between these two end positions. This can provide for further assembly-related advantages.

The connector receptacle can thereby have a free inner diameter, which can be larger than the diameter of the cylindrical formation in a region, in which the cylindrical formation surrounds the hydraulic piston in the initial position. In the region surrounding the hydraulic piston, the cylindrical formation can thereby simultaneously and directly form the hydraulic cylinder, thus having a cylinder inner surface, which essentially cooperates with the hydraulic piston.

The section having the connector receptacle, which can further preferably also be formed integrally in one piece with the cylindrical formation, can thereby have an inner diameter, which can correspond approximately to, for example, 1.05- to 1.3-times, further for example approximately to 1.1-times the inner diameter of the cylindrical formation.

In a possible design, the hydraulic piston can consist of a piston shaft and a cover part arranged on the end facing away from the second tool. The piston shaft can thereby be surrounded by a return spring, which can support itself on the cover part in the region of an end. In this case, the end of the spring facing away from the cover part supports itself on a section of the cylindrical formation of the device head.

Over a portion of its length, the piston shaft can also be formed as hollow cylinder, thus for example over 50 to 95% of the length, optionally even over the entire length. A weight reduction in the region of the piston shaft is initially attained thereby. Favorable force ratios in the region of the tool, which can be displaced by means of the hydraulic piston, can also be attained thereby.

The clamping screw can thereby retain the cover part by passing through the hollow cylinder. On the end side, the clamping screw can thereby cooperate with a threaded bore, which can be formed in the piston shaft or in a tool receptacle, respectively, which connects to the piston shaft, for receiving the second tool.

An adapter part, for example for connecting a hydraulic hose or a body casting tool part, can be arranged on the connector receptacle. Various adapter parts can thus be provided. In the initial position, a piston head of the hydraulic piston can thereby be located opposite a piston-side front surface of the adapter part.

In further also preferred, design, the device head can be designed in a C-shaped manner as a whole in the described longitudinal cross section, whereby a production in the precision casting process or in the metal printing process can further be given in this respect. An integrally one-piece formation is made possible thereby. According to a possible formation, titanium can be used, for example, as material for producing the device head.

BRIEF DESCRIPTION OF THE DRAWINGS

The invention is described below on the basis of the enclosed drawing, which, however, only represents exemplary embodiments. A part, which is only described on the basis of one of the exemplary embodiments and which is not replaced by a different part in the case of a further exemplary embodiment on the basis of the special feature highlighted there, is thus also described as an at least possible available part for this further exemplary embodiment. The drawing shows.

DESCRIPTION OF THE EMBODIMENTS

Figure 1:
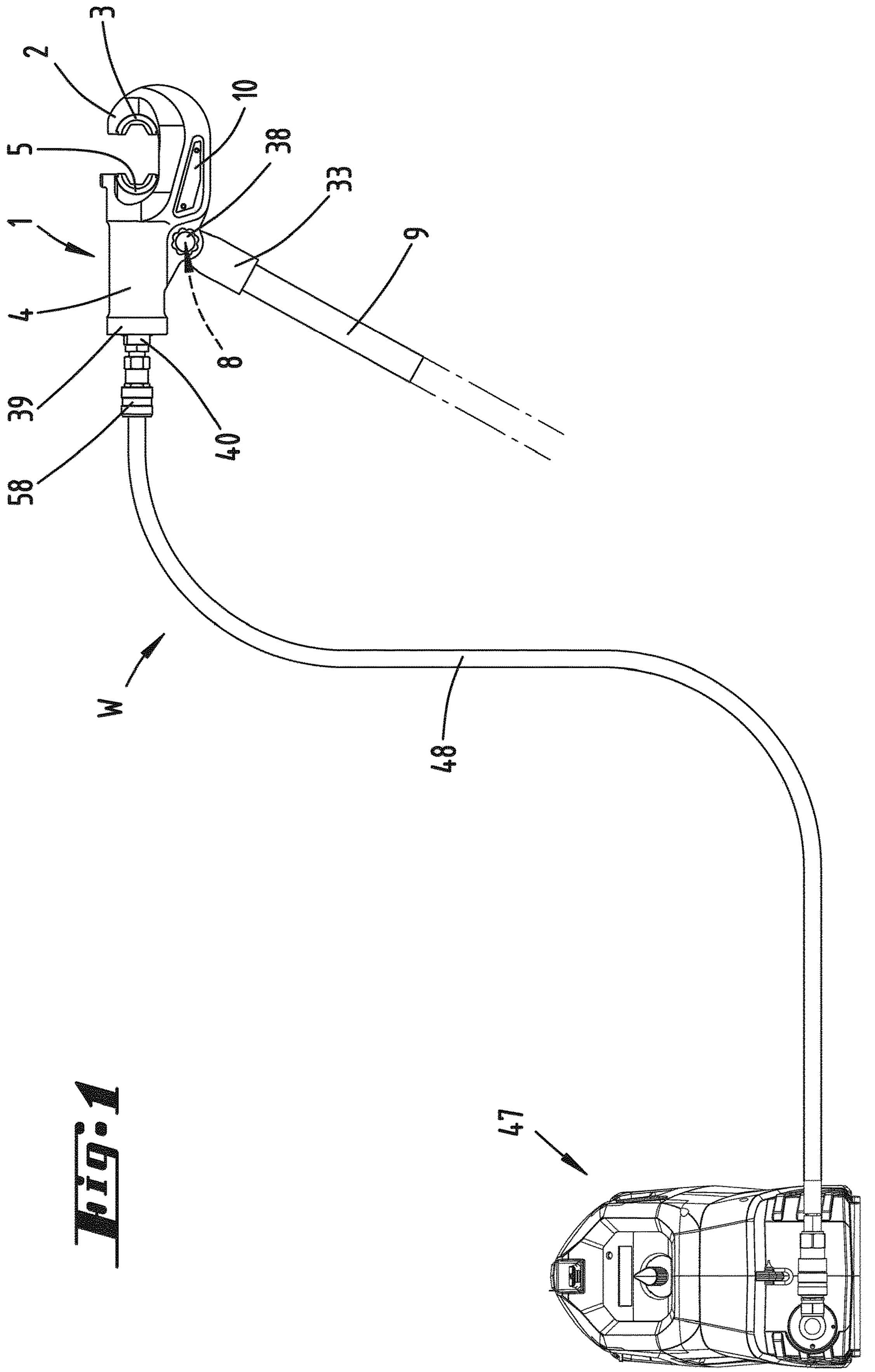
FIG. 1 in schematic illustration, a device head in a first embodiment comprising a retaining rod, wherein the device head is connected to a drive aggregate via a hydraulic hose.

What is illustrated and described, initially with reference to FIGS. 1 to 11, is a first embodiment of a device head 1 of a hydraulically actuatable tool W.

The device head 1 is preferably formed integrally in one piece comprising a counter holder 2, for receiving a first tool 3, and further has, further integrally in one piece, a cylindrical formation 4, in which a hydraulic piston 6 acting on a second tool 5 can be linearly displaced in a directly or indirectly guided manner.

The cylindrical formation 4 can directly mold a hydraulic cylinder 7, in which the hydraulic piston 6 is guided.

Further integrally in one piece with the device head 1, a toothing recess 8 is provided on said device head, for the angularly fixed, but changeable arrangement of a retaining rod 9.

Figure 3:
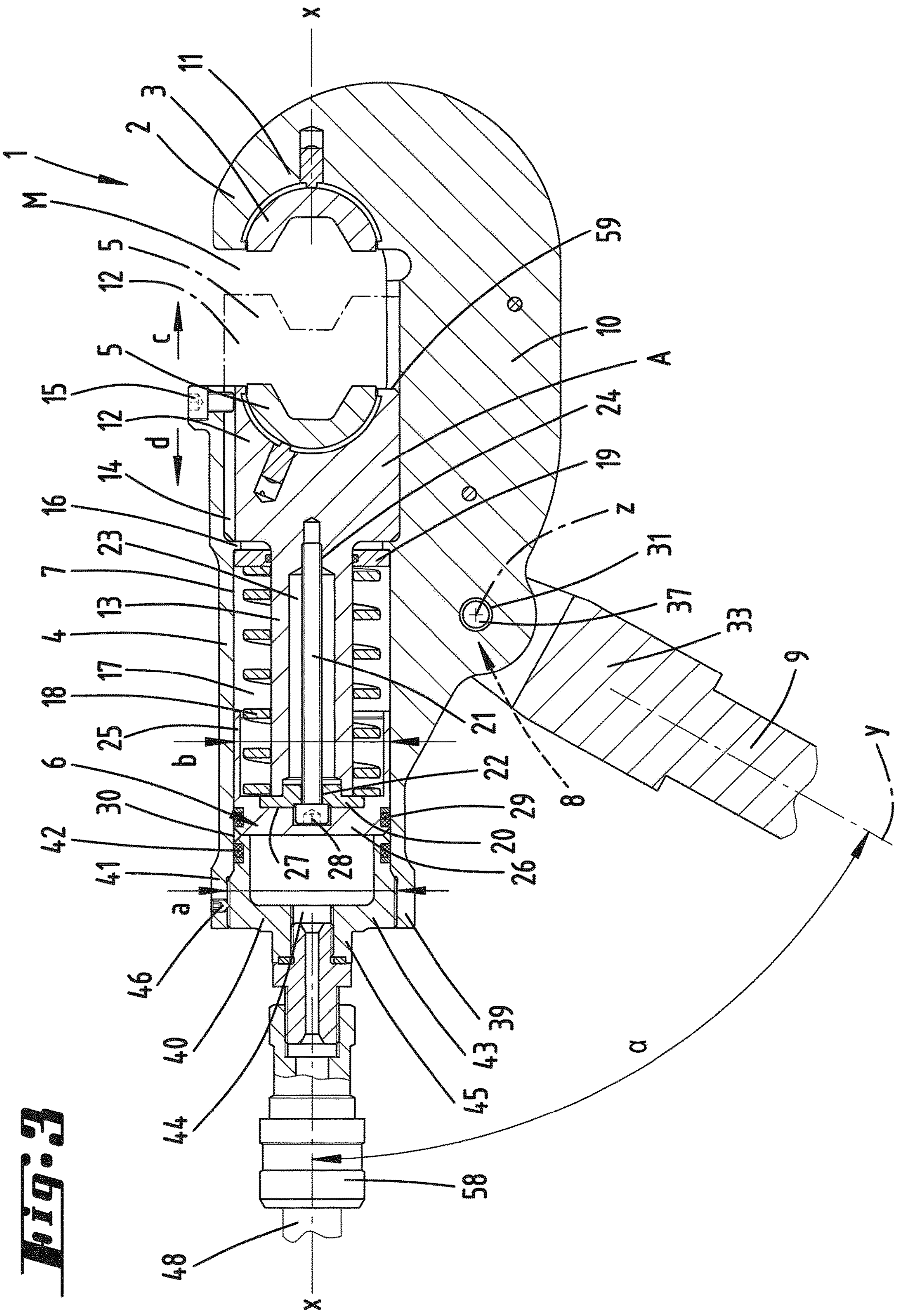
FIG. 3 the enlargement of the region III in FIG. 2.
Figure 4:
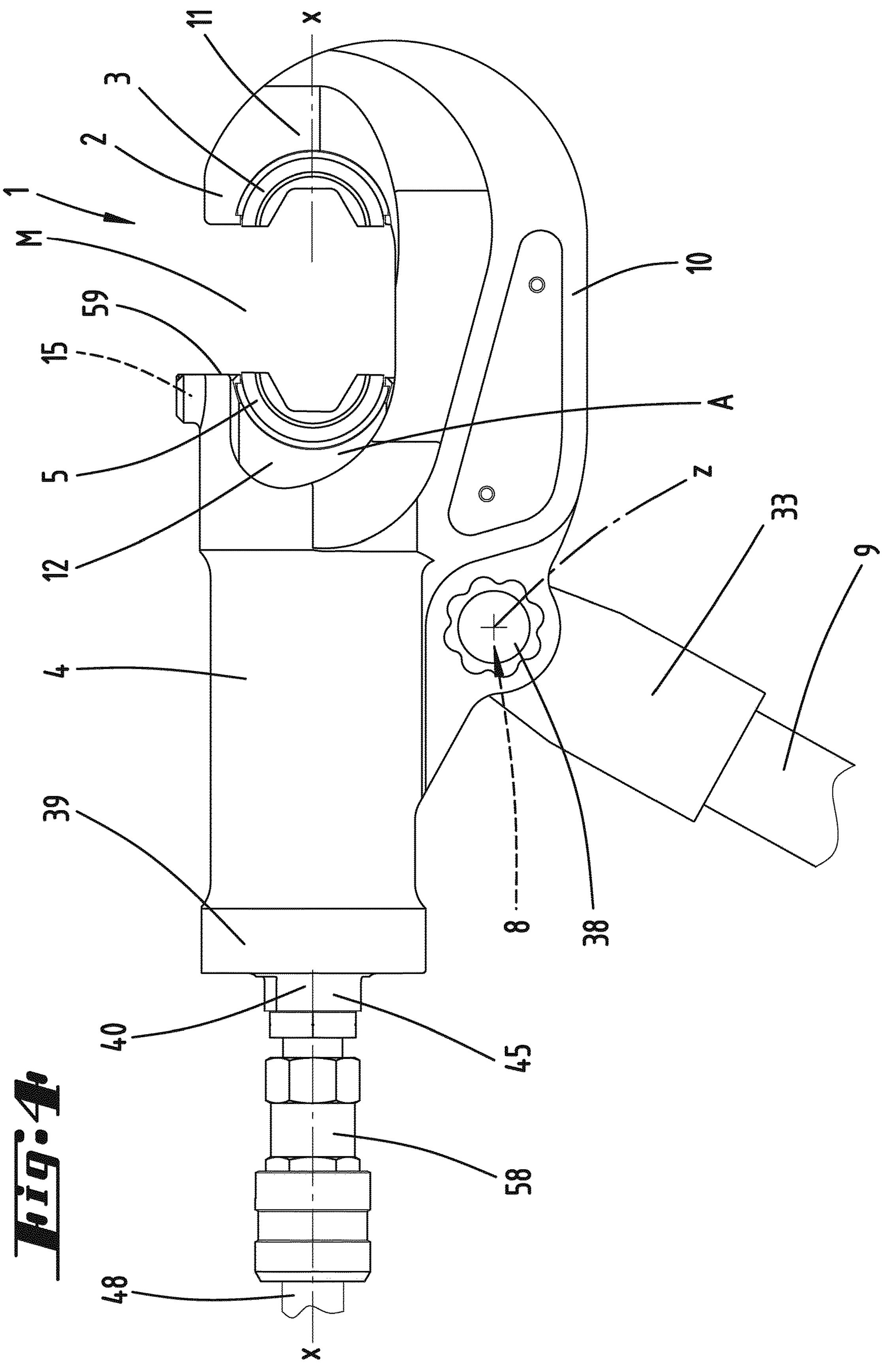
FIG. 4 the device head illustrated in an enlarged manner in a side view illustration according to the view in FIG. 1.
Figure 5:
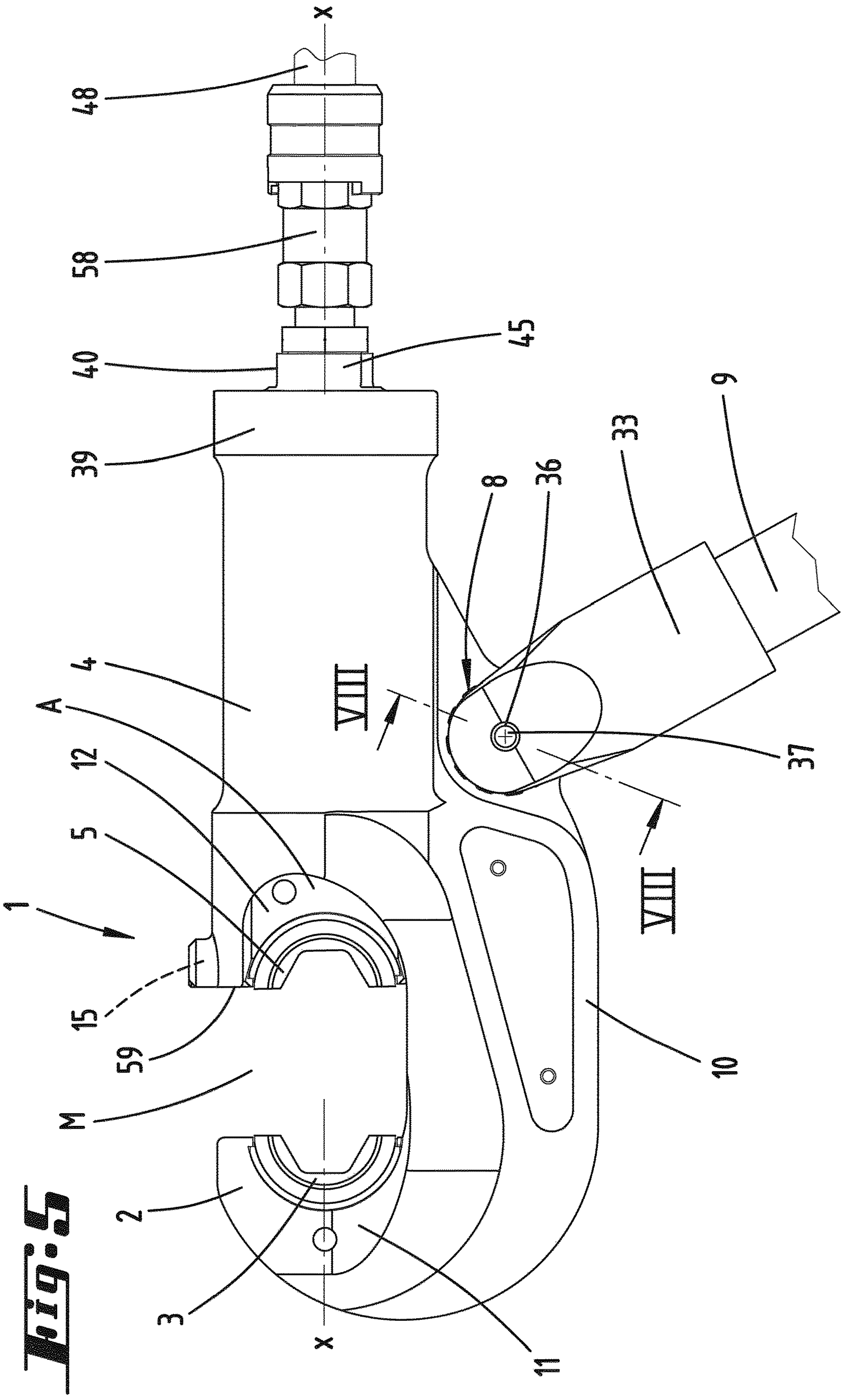
FIG. 5 the device head in a side view located opposite with respect to FIG. 4.
Figure 6:
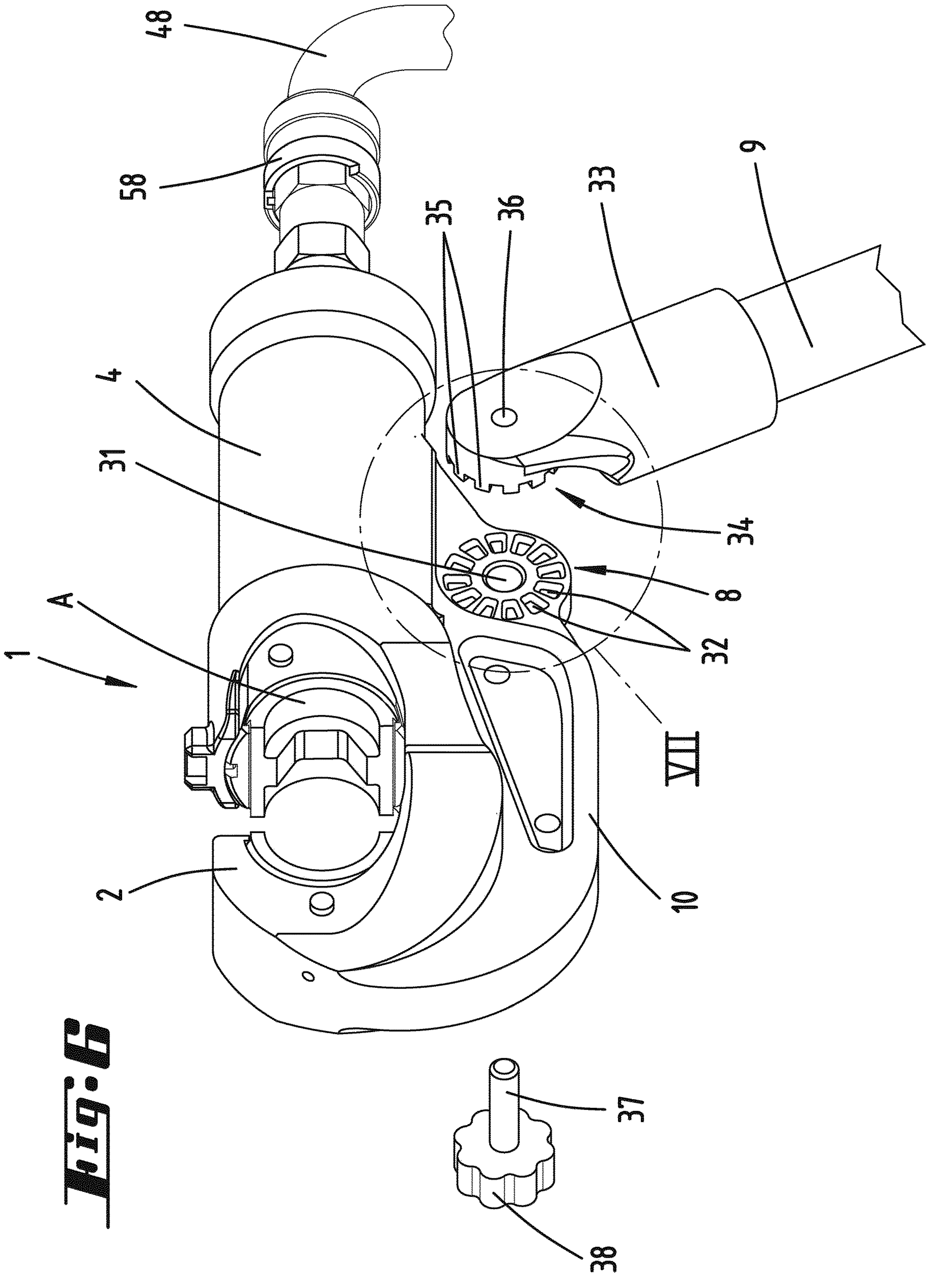
FIG. 6 the device head in a perspective illustration.
Figure 7:
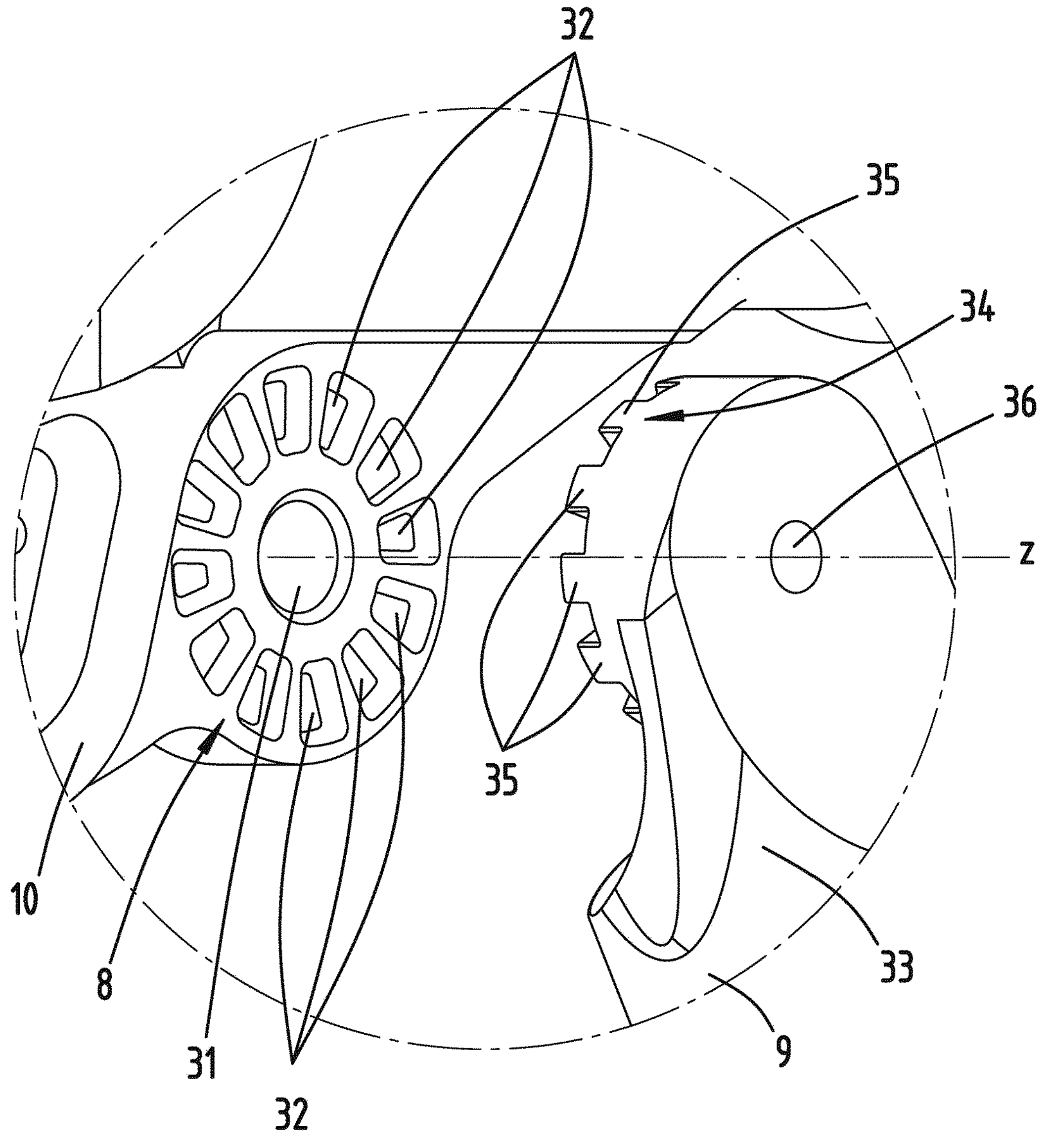
FIG. 7 the enlargement of the region VII in FIG. 6.
Figure 8:
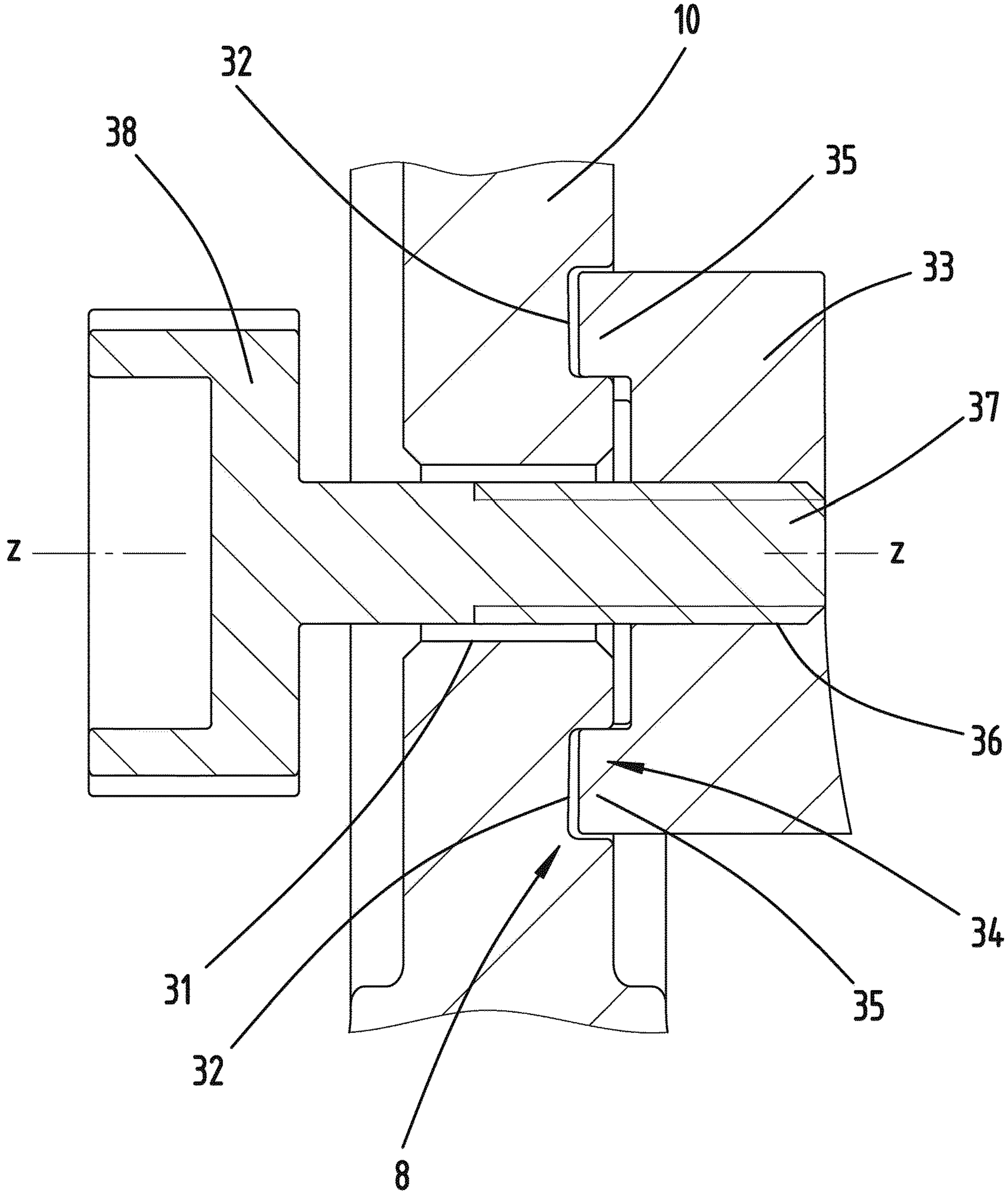
FIG. 8 the section according to the line VIII-VIII in FIG. 5.

As a whole, the device head 1, which is formed integrally in one piece, can be designed approximately C-shaped with respect to a side view according to FIG. 4 or to a longitudinal cross section according to FIG. 3, respectively, in which a hydraulic piston axis x presents itself as line, wherein a C-leg molds the above-mentioned counter holder 2, and the opposite C-leg essentially the cylindrical formation 4. These C-legs are connected to one another via a connection leg 10 (C-web), which runs essentially aligned along the hydraulic piston axis x.

The cylindrical formation 4, which, in the illustrated exemplary embodiment, offers the running surface for the hydraulic piston 6 directly on the wall inner side, can be formed essentially circular cylindrically on the wall outer side with respect to a cross section transversely to the alignment of the axis x. The section of the connection leg 10, which connects to the cylinder wall of the cylindrical formation 4 in this cross section, can, as also preferred, extend essentially in the radial direction with respect to the axis x, whereby the corresponding dimension of the wall thickness of the connection leg 10 in a direction perpendicular to the axis x is smaller, as it corresponds to the dimension of the outer diameter of the cylindrical formation 4. The corresponding thickness of the connection leg 10 can thus correspond approximately to 0.3- to 0.7-times, further approximately to 0.5-times the outer diameter of the cylindrical formation 4.

The counter holder 2 forms a first tool carrier 11. The first tool 3 can be capable of being replaceably arranged therein in a lockable manner.

A second tool carrier 12, which is preferably formed in one piece and of uniform material with a piston shaft 13 extending in the cylindrical formation 4, can be moved towards this first tool carrier 11 or the first tool 3 received therein, respectively. The tool carrier 12 forms a receptacle A for the second tool 5, which is preferably also retained in a replaceable manner here. The axial length of the piston shaft 13 can thereby correspond approximately to 1.3- to 2.5-times the maximum displacement path of the hydraulic piston 6.

Figures 2, 2A:
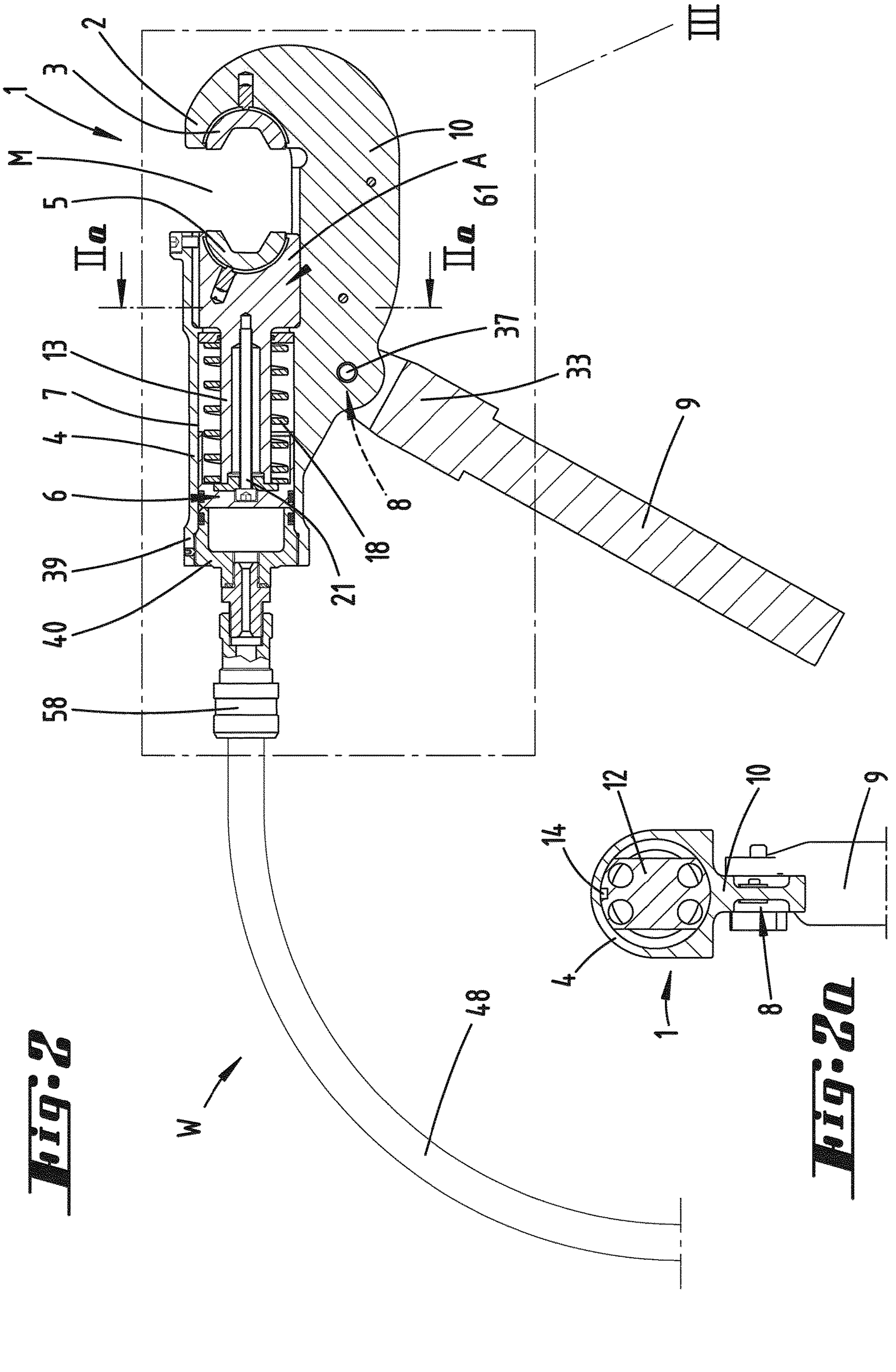
FIG. 2 the device head comprising retaining rod and hydraulic hose in a longitudinal cross sectional illustration, which is enlarged compared to FIG. 1.
FIG. 2*a* the section according to the line IIa-IIa in FIG. 2.

With respect to a cross section according to FIG. 2*a* transversely to the axis x, the second tool carrier 12 can be formed in an essentially elongated rectangular manner. In the case of the illustrated exemplary embodiment, the longitudinal outer edges, which in the use state run perpendicular according to FIG. 2*a*, are formed in an elongated rectilinear manner, while the shorter outer edges viewed transversely thereto are in each case guided along a curved line. These curved lines have a common radius, which refers to the axis x. The radius dimension is adapted to the diameter dimension of the surrounding jacket wall of the cylindrical formation 4. In the region of a curved surface on the wall outer side, the second tool carrier 12 can have, as also illustrated, a holding groove 14, which runs in the axial direction and which is open towards the jacket wall, and with which, in a common operating state, as also illustrated, a retaining screw 15 can engage, which, in the initial position illustrated in FIG. 3, is received and guided in the cylindrical formation 4, which extends approximately to a front surface 59 of the second tool carrier 12 facing the first tool carrier 11, in order to fix the second tool carrier 12 in the circumferential direction, thus in order to prevent rotation around the axis x. After releasing this retaining screw 15 or removal of the screw, respectively—preferably after removal of a further clamping screw 21, of a cover part 20, and optionally of a spring 18, as described in more detail further below—the second tool carrier 12 together with the piston shaft 13, which is formed in one piece with the tool carrier 12, can be guided out through the free device jaw M resulting between the first and the second tool carrier 11 and 12 in the initial position for example according to FIG. 3, or a corresponding assembly can take place, respectively, via this path. A rotation of the tool carrier 12 by preferably approximately 90° about the axis x is optionally required for this purpose.

The section of the cylindrical formation 14 receiving the second tool carrier can, as also illustrated, have an enlarged diameter compared to the section of the cylindrical formation 4, in which the hydraulic piston 6 is guided. The inner diameter of the section of the cylindrical formation 4 surrounding the second tool carrier 12 can thus correspond approximately to 1.05- to 1.2-times the inner diameter of the section encompassing the hydraulic piston 6.

A step, which can furthermore form a stop 16, which furthermore protrudes radially to the inside and which is essentially ring-shaped as a whole, thus results on the wall inner side in the transition from the section of the cylindrical formation 4 encompassing the second tool carrier 12 into the section encompassing the hydraulic piston 6. In the initial position, the second tool carrier 12 can move against this stop 16.

According to the illustrations, the piston shaft 13, which connects to the second tool carrier essentially concentrically to the axis x, can be formed as hollow cylinder 23 essentially over its entire axial length. The outer diameter thereof is thereby dimensioned to be smaller than the inner diameter of the corresponding section of the cylindrical formation 4, so that an annular space 17 results encompassing to the piston shaft 13. The outer diameter of the piston shaft 13 can thereby correspond approximately to 0.5- to 0.8-times the inner diameter of the section of the cylindrical formation 4 encompassing the hydraulic piston 6.

A spring 18, for example in the form of a cylinder pressure spring, is provided in the annular space 17, encompassing the piston shaft 13. This spring 18 supports itself with its end facing the second tool carrier 12 on the stop 16 of the device head 1 via a circular ring-shaped thrust washer 19, while the end located opposite in the axial direction acts against the facing bottom side of a cover part 20 of the piston shaft 13.

The cover part 20 is thereby arranged on the front-side free end of the piston shaft 13, thereby preferably protrudes circumferentially evenly radially beyond the jacket wall of the piston shaft 13. The spring 18 preferably acts against the radial step formed in this way.

The cover part 20 can be fixed via a clamping screw 21, which is aligned along the axis x, which clamping screw 21 passes through the cover part 20 in the region of an opening 22, which is aligned concentrically to the axis x. The clamping screw 21 further passes through the hollow cylinder 23 of the piston shaft 13 over the entire length thereof and is in threaded engagement with a correspondingly positioned threaded bore 24 of the second tool carrier 12 on the end side.

As a result of the above-described arrangement, a loading of the second tool carrier 12 results via the spring 18 in the direction of the initial position, which is illustrated for example in FIG. 3, in which the tool carriers 11 and 12 or the tools 3 and 5 received therein, respectively, assume a maximum distance from one another, viewed in the axial direction.

The hydraulic piston 6 is arranged for acting on the end of the piston shaft 13, which is provided with the cover part 20. For this purpose, the hydraulic piston 6 as a whole can, as also illustrated, have a pot-shaped design, comprising a piston wall 25, which revolves concentrically to the axis x and which, as can be seen, can encompass a subsection of the spring 18 radially on the outside.

The piston bottom 26 acts with its surface on the pot inner side against the facing front surface of the cover part 20, whereby the respective piston bottom inner surface can further have a central depression 27, for example for receiving the screw head 28 of the clamping screw 21.

Figure 11:
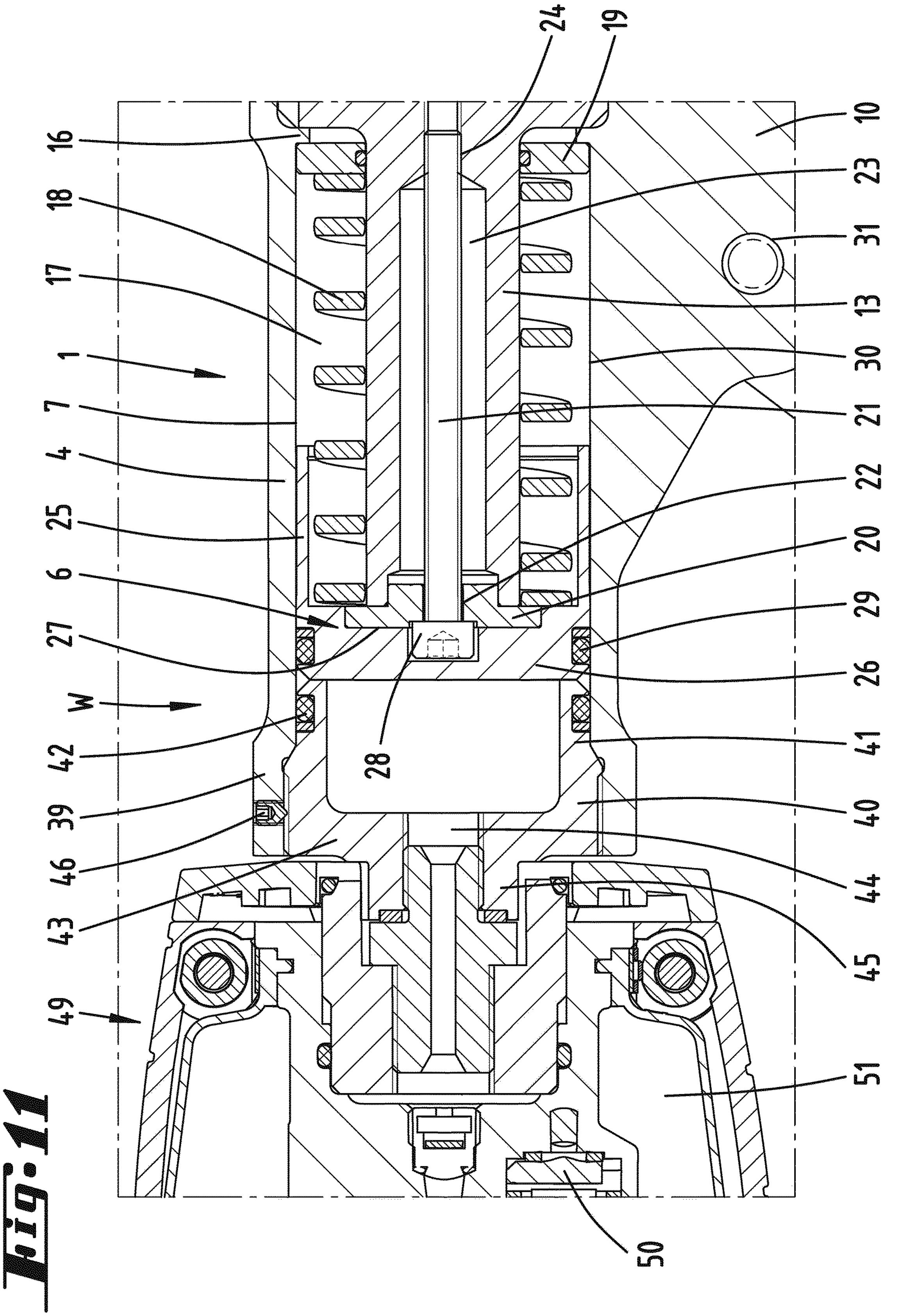
FIG. 11 the enlargement of the region XI in FIG. 10.

A step-like depression can furthermore result in this respect, thus in particular for receiving the cover part 20, preferably over the entire axial thickness thereof and of the screw head 28 (see, for example, the illustration in FIG. 11).

The piston bottom inner surface can thus also lend itself as support surface for the spring 18, so that a return force in the direction of the initial position acts on the hydraulic piston 6 via the spring 18 directly or only indirectly via the cover part 20.

A seal 29 is captured in the region of the piston bottom 26 in a circumferential annular groove, which is open radially to the outside, for sealing the hydraulic piston 6 against the inner wall 30 of the hydraulic cylinder 7, which is formed by means of the cylindrical formation 4.

The toothing recess 8 for securing the retaining rod 9 can, as also preferred, be formed laterally offset to the cylindrical formation 4 in the region of the connection leg 10 with reference to a longitudinal cross section according to FIG. 3, thereby preferably in radial overlap to the cylindrical formation 4, which means that in the case of a projection of the toothing recess 8 in a direction transversely to the alignment of the axis x and in the direction of the cylindrical formation 4, the toothing recess 8 is essentially received in said cylindrical formation.

The toothing recess 8 can, as also illustrated, be formed only on one side of the connection leg 10. For this purpose, a passage opening 31, which passes completely through the connection leg 10, can initially be provided for this purpose, for which depressions 32, which are evenly spaced apart from one another in the circumferential direction and which are preferably formed identically, can be provided in the connection leg 10 concentrically circumferentially to the formation of the toothing recess 8. According to the illustration in FIG. 7, twelve such depressions 32 can thus be provided in an evenly distributed manner around the passage opening 31.

On a retaining end 33, the retaining rod 9, which can be fixed via the toothing recess 8, has a counter toothing recess 34, which, according to the illustrated exemplary embodiment, can be formed by means of a number of protrusions 35 adapted to the number of depressions 32 of the toothing recess 8. These protrusions 35 can also be designed identically with respect to their cross sectional design and depth, whereby these protrusions 35 can be provided evenly to one another in the circumferential direction, according to the arrangement of the depressions 32.

The protrusions 35 are cross sectionally adapted to the depressions 32, so that a positive connection of the retaining rod 9 with the device head 1 can be attained in the manner of a Hirth serration as a result of engagement of the protrusions 35 with the depressions 32.

By means of the twelve depressions 32, which are provided in an exemplary manner, an angular securing of the retaining rod 9—based on the exemplary embodiment—can take place in 30 degrees steps. Different angles α can thus be drawn between the hydraulic piston axis x, which essentially corresponds to the longitudinal axis of the device head 1, and a longitudinal axis y of the retaining rod 9.

A threaded bore 36 can, as also preferred, be provided in the retaining end 33 centrally through the arrangement of the protrusions 35 on the retaining end 33 of the retaining rod 9. In assigned position of the retaining rod 9, this threaded bore 36 overlaps with the passage opening 31 of the device head 1.

To fix the found alignment position of the retaining rod 9 and thus for securing the corresponding positive connection position of the toothing recess 8 and the counter toothing recess 34, a fixing screw 37 can be provided, which, starting at the side located opposite the toothing recess 8, passes through the passage opening 31 and engages with the threaded bore 36 of the retaining rod 9. A bracing of retaining rod 9, in particular the counter toothing recess 34 thereof, with the toothing recess 8 of the device head 1 can be attained by means of a handling knob 38 connected at the opposite end to the end cooperating with the threaded bore 36.

The retaining rod 9 can be pivoted about the geometrical pivot axis z, which is provided by the fixing screw 37 and which extends perpendicularly to the axes x and y.

By using the retaining rod 9, which is aligned in this way and fastened to the device head 1, the device head 1 can also be guided towards remote operating positions and/or the device head 1 can experience a support or the like via the retaining rod 9.

In a direction facing away from the second tool carrier 2, the cylindrical formation 4 can further extend beyond the hydraulic piston 6, in particular the piston bottom 26, in the direction of extension of the axis x, as can further be seen from the graphic representations. In the initial position, the hydraulic piston 6 is thus also inserted completely in the cylindrical formation 4.

The section of the cylindrical formation 4 protruding beyond the piston bottom 26 in the initial position can mold a connector receptacle 39 for an adapter part 40. The free inner diameter a can, as also preferred, thereby be selected to be larger, for example by 1.05- to 1.2-times, in the region of the connector receptacle 39 compared to the free inner diameter b in the region of the section of the cylindrical formation 4 receiving the hydraulic cylinder 7.

An internal thread can furthermore be formed on the wall inner side of the connector receptacle 39, for cooperating with an external thread of the adapter part 40 in the region of the circumferential adapter partial wall 41 thereof. The adapter partial wall 41 can furthermore, as also preferred, have a seal 42 located inside in a groove, which is open on the wall outer side and radially to the outside, which acts against the inner wall 30 of the cylindrical formation 4 or of the connector receptacle 39, respectively.

In the center, thus centrally passed through by the geometrical axis x, an adapter part bottom 43 aligned transversely to the axis x maintains an inflow opening 44 for a hydraulic medium. On the outer side or facing away from the hydraulic piston 6, respectively, this inflow opening 44 is encompassed by a frustum-like adapter part connection 45.

The surface of the adapter part bottom 43 facing away from the hydraulic piston 6 can essentially be aligned with the assigned front surface of the cylindrical formation 4.

In the use position, when screwed into the connector receptacle 39, the adapter part 40 can further be fixed by means of a threaded pin 46 passing through the wall of the connector receptacle 39.

According to the first application illustrated in FIGS. 1 to 8, the device head 1 can be operated via a separate hydraulic aggregate 47, whereby a hydraulic hose 48 is arranged between the hydraulic aggregate 47 and the device head 1 for the free movability of the device head 1. As can be seen, the hydraulic hose 48 is connected on one end to the hydraulic aggregate 47 and on the other end to the device head 1 via a hose connection 58 so as to be sealed via the adapter part 40.

A corresponding hydraulic pressure is generated via the hydraulic aggregate 47.

To displace the hydraulic piston 6 and thus the tool carrier 12 carrying the second tool 5 in the direction of the operating end position thereof, which is illustrated schematically in FIG. 3 in the manner of a dot-dash line, hydraulic fluid is pumped into the space resulting between the adapter part 40 and the piston bottom 26, so that the hydraulic piston is displaced against the return force of the spring 18 in the direction c as a result of an increase of the hydraulic pressure of the hydraulic piston resulting thereby.

Upon reaching the operating end position, a pressure reduction can be attained automatically or also as a result of an intervention by the user, but furthermore optionally also prior to reaching the operating end position, so that an automatic return of the hydraulic piston 6 and thus of the second tool carrier 12 in the direction of movement d back into the initial position can be attained.

Figure 9:
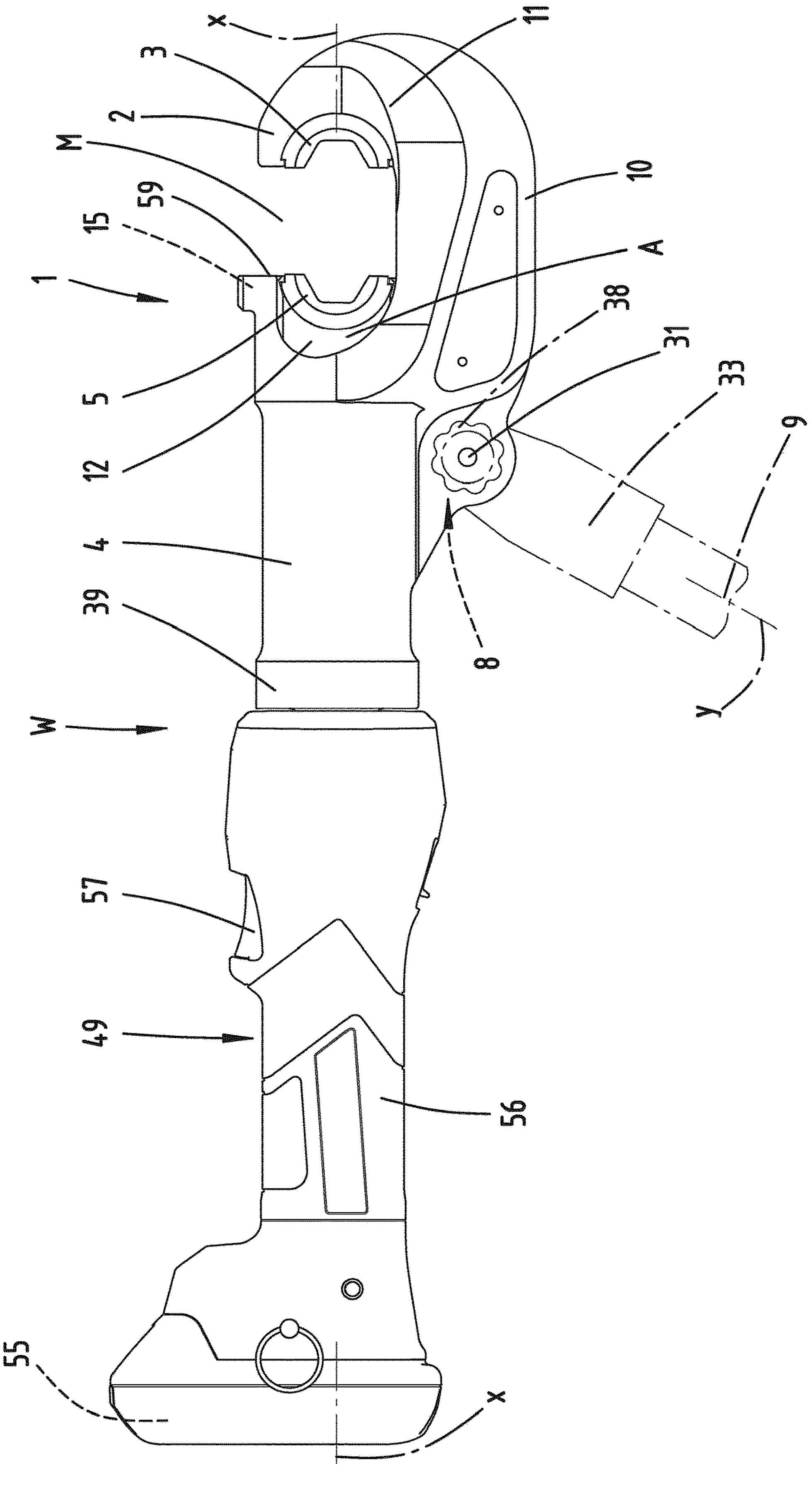
FIG. 9 the device head in a side view according to FIG. 4, but in the case of arrangement on a body casting tool part.
Figure 10:
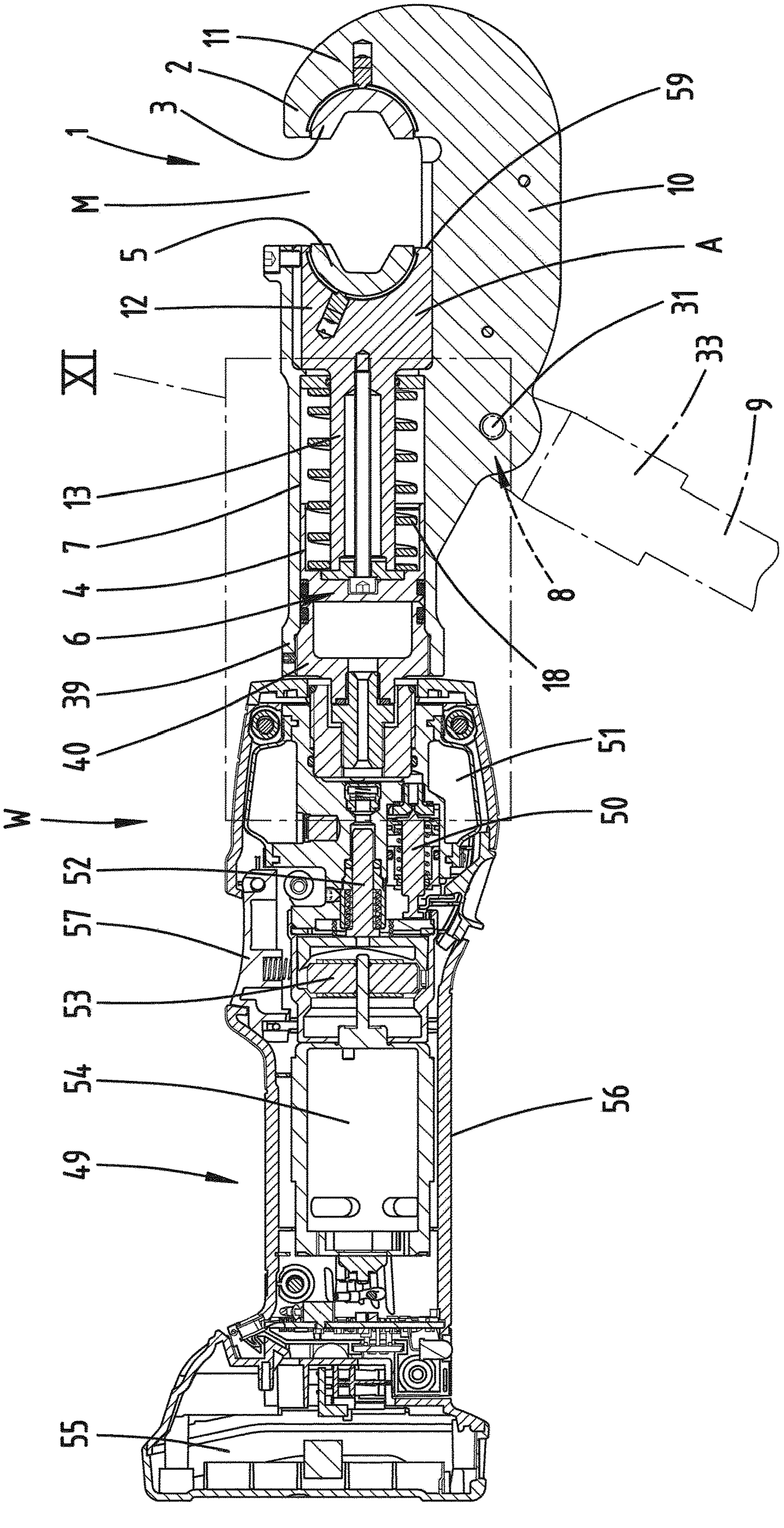
FIG. 10 the arrangement according to FIG. 9 in a longitudinal cross sectional illustration.

In the alternative, the device head 1, as further shown in the illustrations of FIGS. 9 to 11, can be connected to a body casting tool part 49. The adapter part 40 can also serve this purpose, optionally the same adapter part 40 as it is also used for connecting a hydraulic hose 48, but, in the alternative, also an adapter part 40, which is provided separately for the body casting tool part 49.

The body casting tool part 49 as a whole can be formed essentially in an elongated rod-shaped manner, which generally supports a one-hand operation of the device. By means of a possible arrangement of the retaining rod 9, a further support can be given in the region of the device head 1. The tool W, which is thus comprised of body casting tool part 49 and device head 1, however, can furthermore also be used alone without a retaining rod 9, which is why the retaining rod 9 is only optionally shown in dash-dotted illustrations in the illustration of the second embodiment. The arrangement of the retaining rod 9, which can be released without tools, above the fixing screw 37 offers such an optional arrangement.

A rod-shaped body casting tool part 49 is known from the above-cited EP 1519813B1. In particular with regard to the function of the body casting tool part 49, the content of this patent is hereby included in its entirety in the disclosure of the present invention, also for the purpose of including features of this patent in claims of the present invention.

With respect to the design of the body casting tool part 49, the connection with the subject matter described in the mentioned EP 1519813B1 can be seen for instance with regard to a return valve 50, a tank 51, and a pumping plunger 52 with respect to the illustration in FIG. 10. As a whole, it can also be seen in this context that a hydraulic medium pump 53 and an electric motor 54 for the hydraulic medium pump 53 are provided in arrangement one behind the other. The electrical supply in particular of the electric motor 54, but furthermore also of a non-illustrated control unit and of further electronic components in the body casting tool part 49, is provided by the arrangement of an accumulator 55.

The body casting tool part 49 further has a grip region 56 for the conventional clasping of the tool part housing by means of a hand. An actuating button 57, assigned to the grip region 56, is provided in an ergonomically favorable manner.

In the case of this embodiment, the hydraulic piston 6 is also displaced against the force of the spring 18 in the direction of the operating end position as a result of a pressure increase.

FIGS. 12 to 16 show a second embodiment of the device head 1, which differs compared to the above-described embodiment, in particular with regard to the cylindrical formation 4 and a guidance of the receptacle A or of the second tool carrier 12, respectively, on the device head 1. The general mode of action and mode of operation as well as the general setup for hydraulically acting on the receptacle A essentially corresponds to the above-described first embodiment. The receptacle A or the second tool carrier 12, respectively, is thus also preferably formed here in one piece and further preferably of uniform material with the piston shaft 13.

In the case of this embodiment, in contrast to the above-described exemplary embodiment, the cylindrical formation 4 extends, starting at the adapter part bottom 43, only approximately to the rear surface 60 facing away from the front surface 59 of the receptacle A in step-like transition from the piston shaft 13 into the receptacle A. In the case of this embodiment, the receptacle A or the second tool carrier 12, respectively (optionally comprising the second tool 5) is thus exposed between the front surfaces, which face one another, of the cylindrical formation 4 and of the counter holder 2, except for the region of a bottom-side support and guidance in the region of the connector leg 10.

Figure 14:
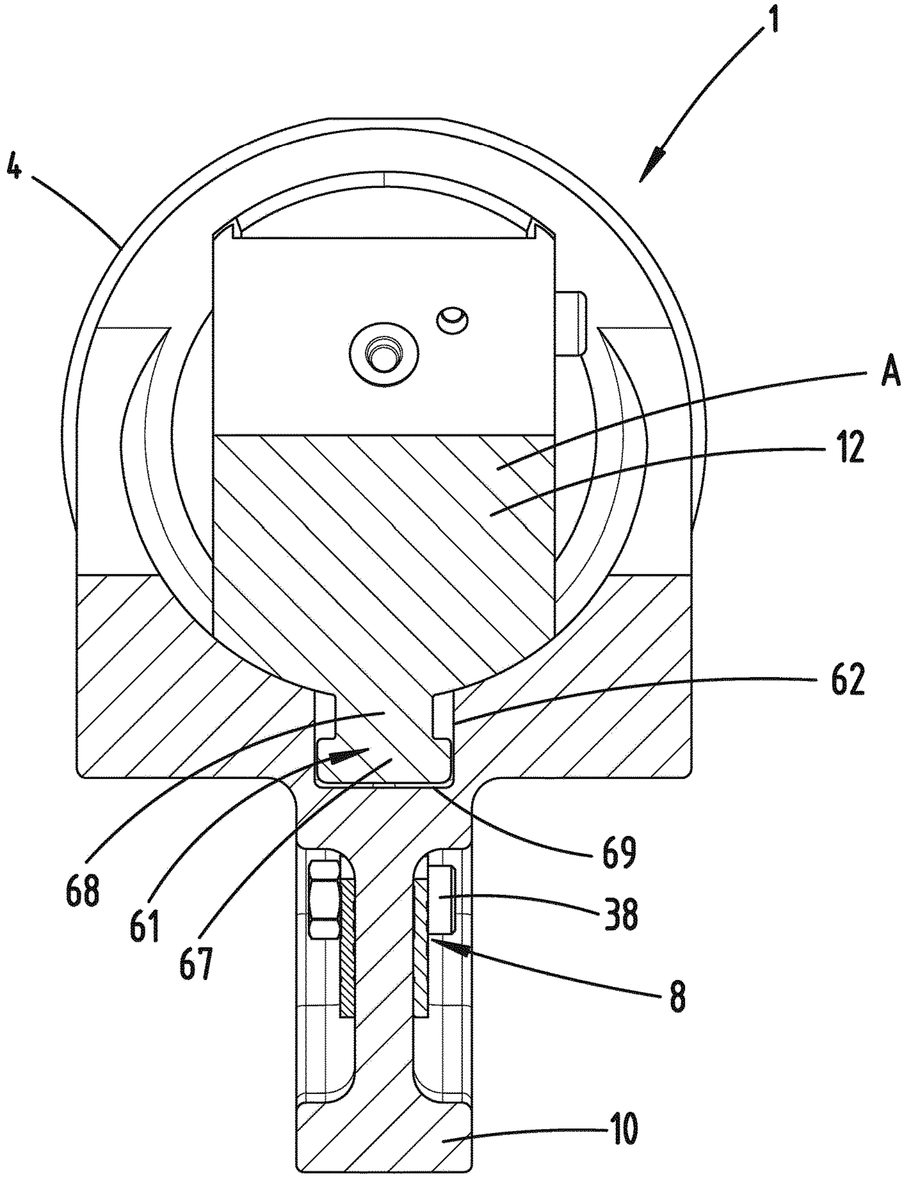
FIG. 14 the section according to the line XIV-XIV in FIG. 13, relating to an initial position of a receptacle for a second tool.
Figure 15:
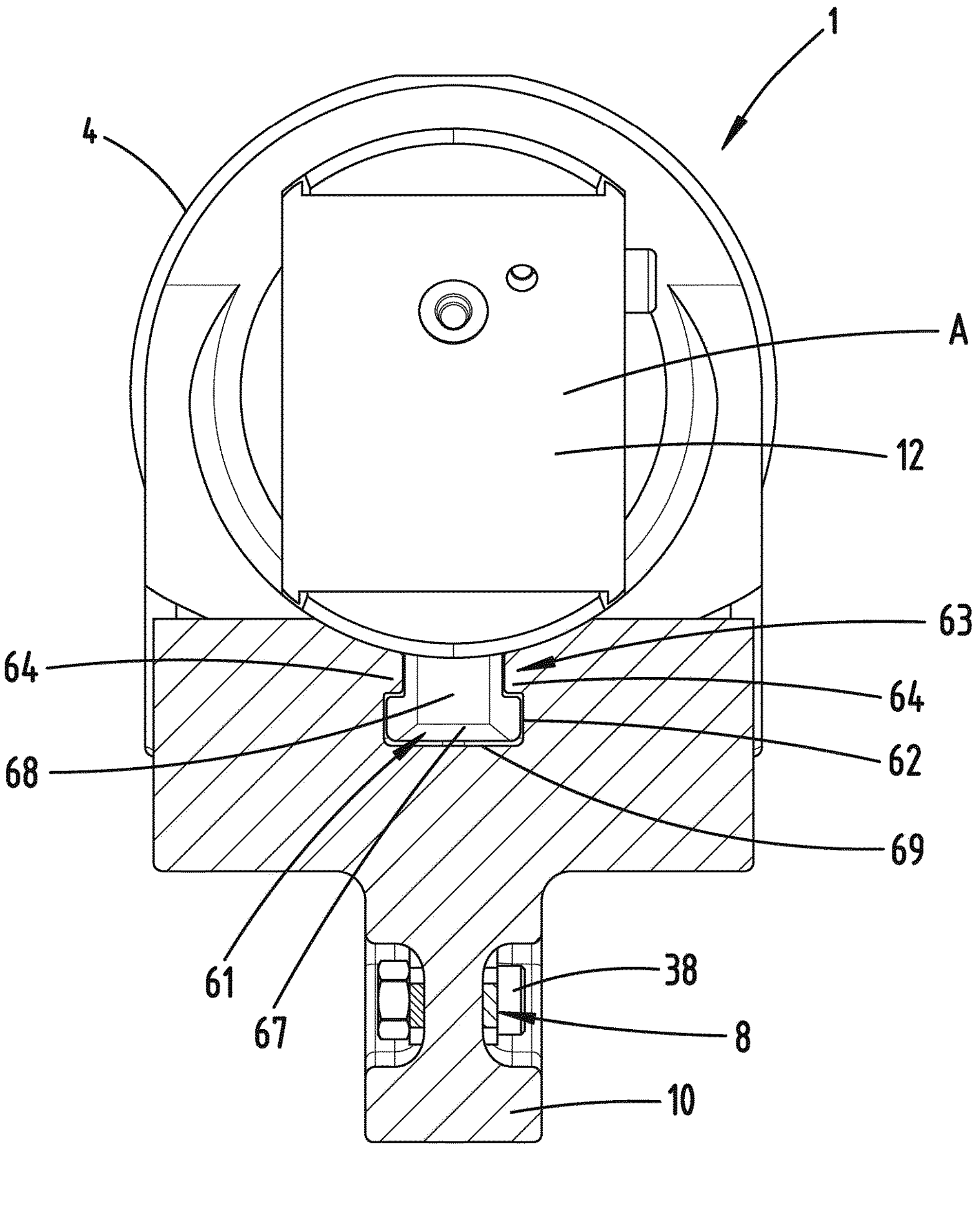
FIG. 15 the section according to the line XV-XV in FIG. 13.

As can be seen in particular from the sectional illustrations in FIGS. 14 and 15, the receptacle A or the second tool carrier 12, respectively, can have a guide protrusion 61, which is essentially T-shaped in the cross section according to FIG. 14, on the bottom side, i.e. facing the connector leg 10 of the device head 1. In the conventional operating position, as also illustrated, the guide protrusion 61 can be guided in a guide groove 62 of the connector leg 10, which is directed in the direction of movement d. The T-head 67 of the guide protrusion 61 can thereby be arranged so as to face the groove bottom of the guide groove 62. The T-head 67 of the guide protrusion can further be tied to the second tool carrier 12 via a T-web 68, which, in contrast, is tapered in the cross section according to FIG. 14.

As a result of the cooperation of guide protrusion 61 and guide groove 62, a protection against rotation of the receptacle A or of the second tool carrier 12, respectively, about the axis x is initially given, furthermore also a linear guidance of the receptacle A in response to a displacement thereof in the direction of movement d.

Over the length l viewed in the direction of movement d, the guide groove 62 of the device head 1 can moreover partially formed as an undercut 63, which acts transversely to the direction of movement d. This undercut 63 can be given, for example, by means of ribs 64 directed towards one another, which are arranged so as to be located opposite one another in the cross section according to FIG. 5, which are formed at a distance from the groove bottom 69 and which are suitable to engage with the tapered region of the guide protrusion 61 between the T-head 67 and the receptacle A.

According to the illustrated embodiment, the undercut 63 can extend, for example, over approximately half the length l of the guide groove 62 in the direction of movement d, up to approximately ⅔ or ¾ of this entire length l. It is thus further preferably provided that this undercut section extends in particular over the conventional displacement path of the receptacle A, thus over the last half of the displacement path up to the last ¾ of the displacement path, so that a corresponding guidance and securing against a displacement of the receptacle A in a transverse direction to the direction of movement d is given in particular in the critical displacement situation of the receptacle A, in which force is applied.

This undercut is thus further given in particular in the operating end position.

Figure 13:
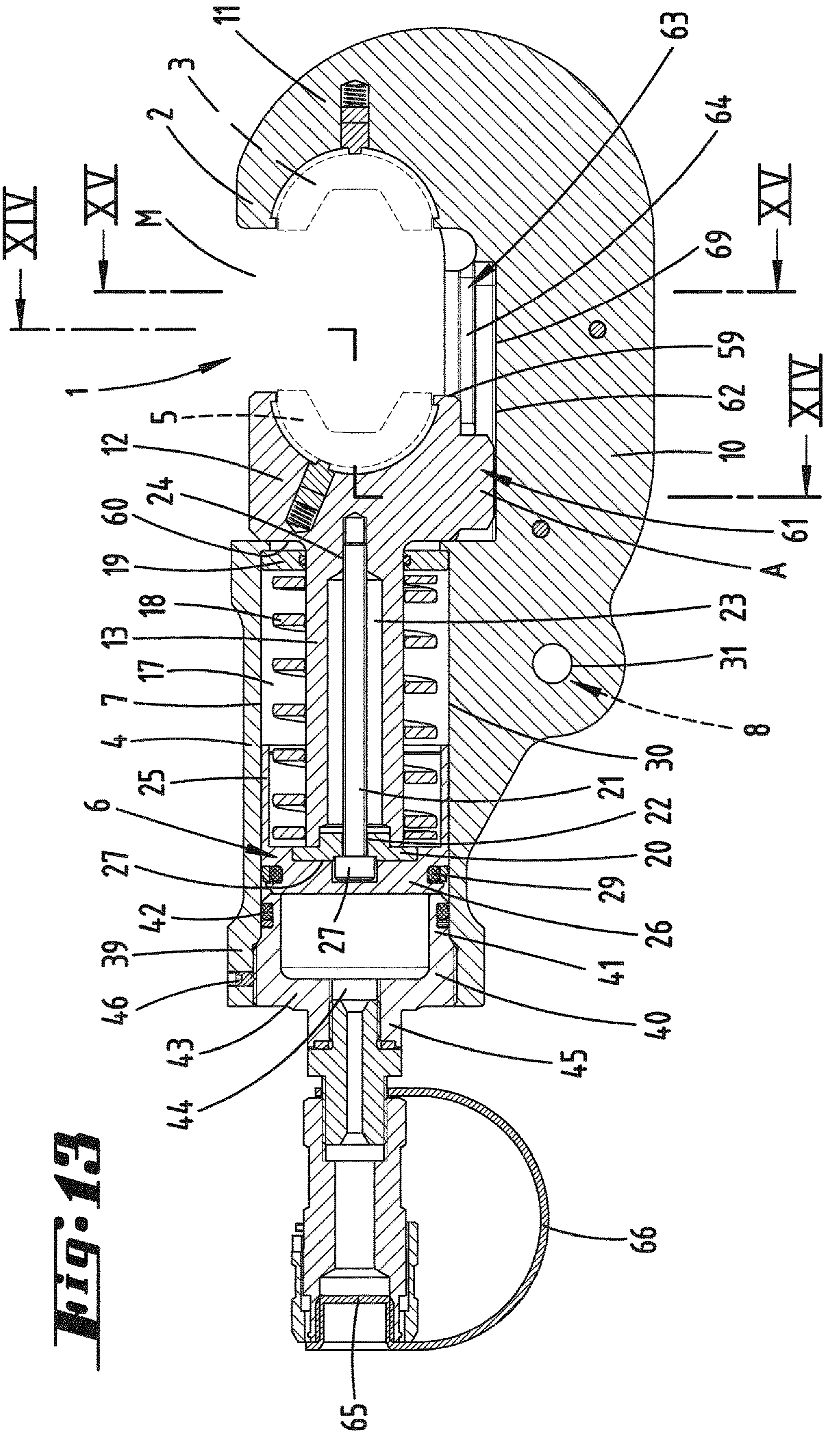
FIG. 13 a sectional illustration corresponding to FIG. 3, but relating to the embodiment according to FIG. 12.

In the initial position according to FIG. 13, which optionally forms a basic position, in particular a basic position, which is not acted upon via the hydraulic piston 6, the guide groove 62 is preferably not provided with ribs 64, so that an undercut cooperating with the receptacle A is not given in this region (see in particular sectional illustration in FIG. 14). This offers the advantage of a favorable assembly and disassembly of the receptacle A formed in one piece with the piston shaft 13 with given protection against rotation and tilting of the receptacle A as part of, for example, a pressing or cutting process.

Figure 16:
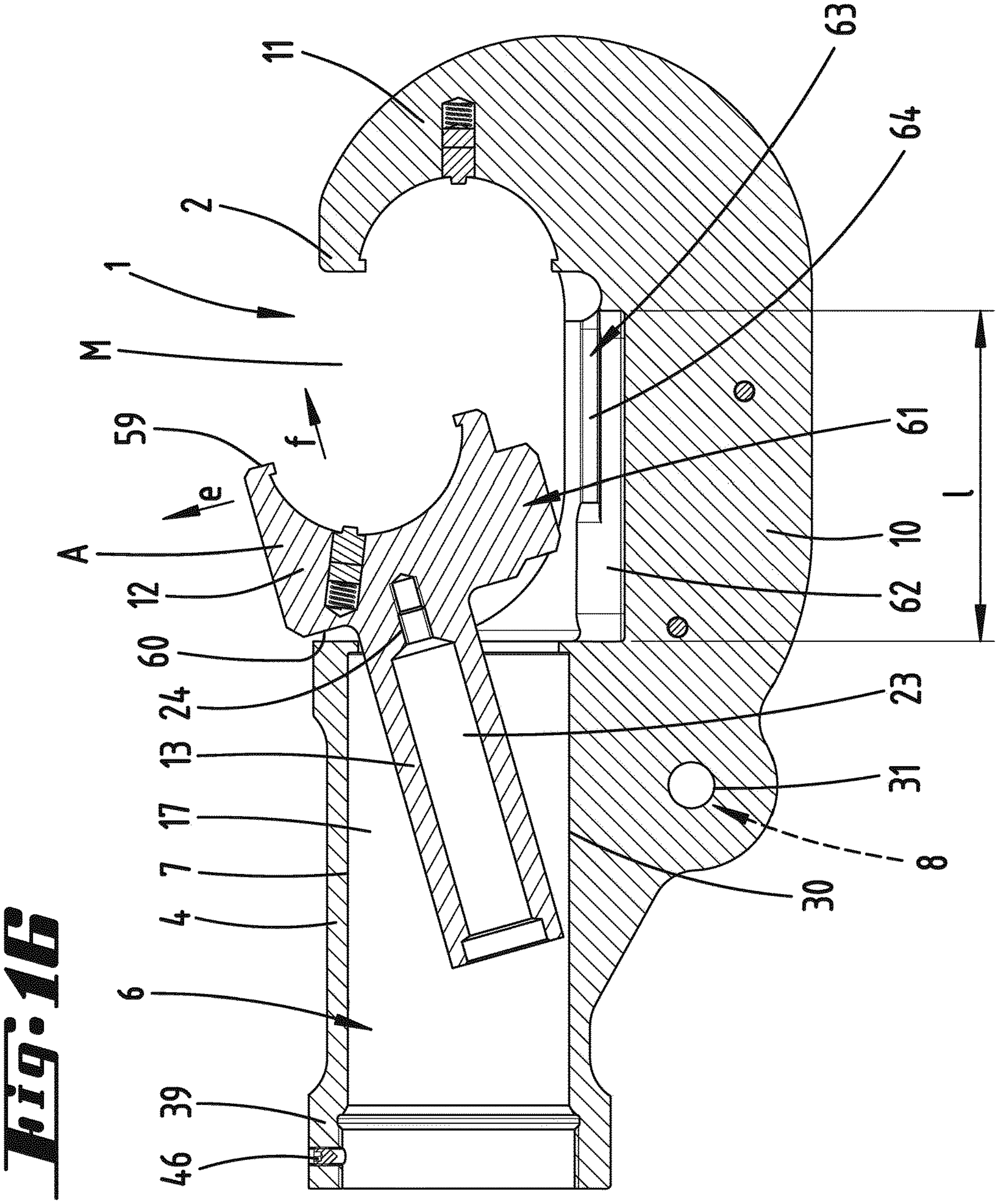
FIG. 16 a sectional illustration essentially corresponding to FIG. 13, but relating to an assembly or disassembly position, respectively, of the receptacle.

FIG. 16 shows such an assembly or disassembly position, respectively, of the receptacle A formed in one piece with the piston shaft 13 or of the second tool carrier 12, respectively. For the disassembly, the adapter part bottom 43 with the seal 42 thereof and the piston bottom 26 with the seal 29 thereof can thus be removed from the hydraulic cylinder 7, after which the clamping screw 21 is exposed for releasing it. After removal of the clamping screw 21, the cover part 20 as well as the spring 18 can be removed. After this, the piston shaft 13 is located alone and freely in the hydraulic cylinder 7.

After this, the receptacle A or the second tool carrier 12, respectively, can be shifted in a direction transversely to the direction of movement d (see arrow e), so that the guide protrusion 61 can leave the guide groove 62. This lifting or tilting movement, respectively, in the arrow direction e can be overlapped directly with a pull-out direction f (essentially in the axial direction of the piston shaft 13) for the removal of the receptacle A with the piston shaft 13 through the free device jaw m. An assembly preferably takes place in reverse order.

Figure 12:
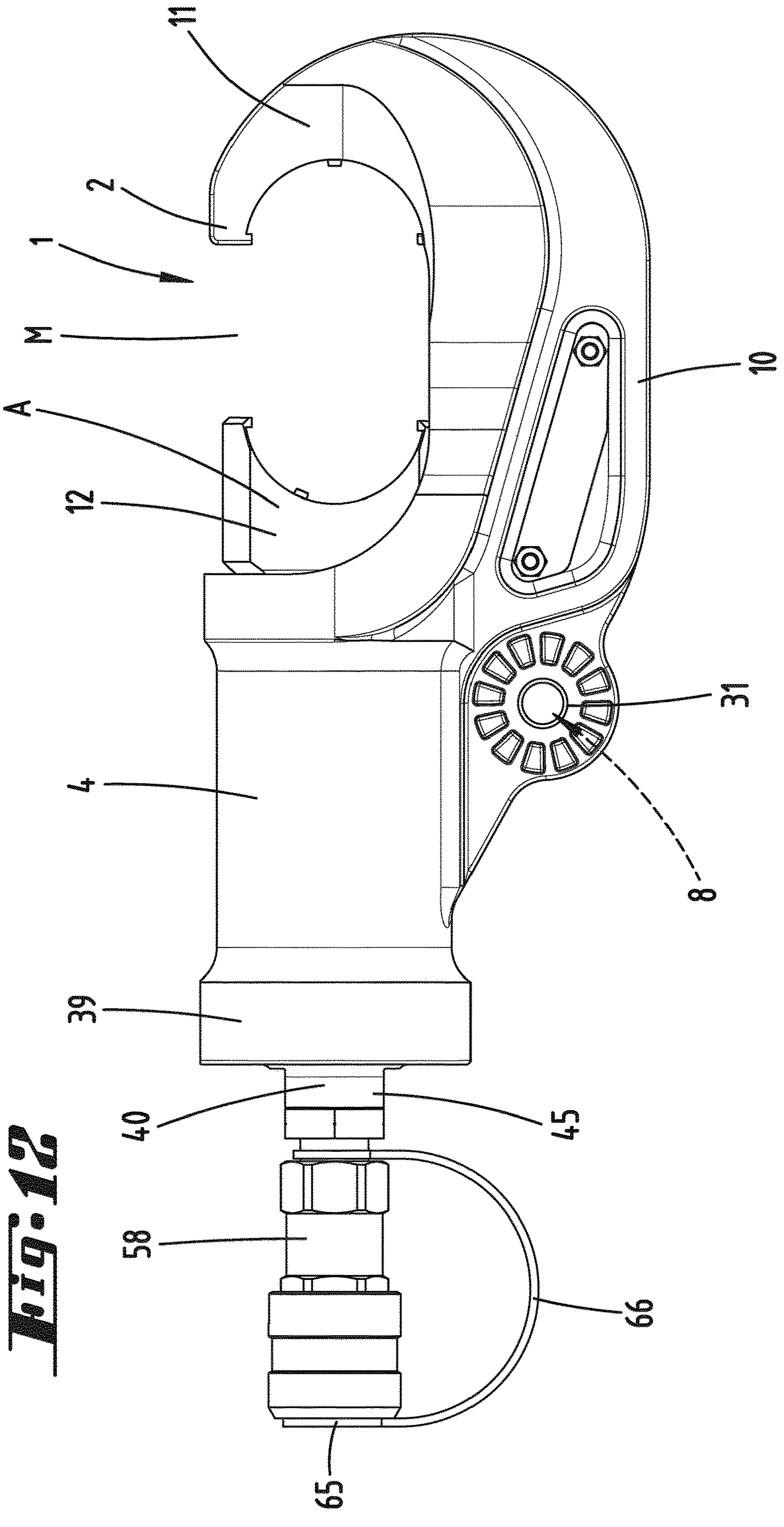
FIG. 12 an illustration corresponding to FIG. 4, but relating to a second embodiment of the device head.

As can further be seen in particular from the illustration in FIG. 12, the opening can be closed by means of a plug 65 in the region of the free end of the hose connection 58 in the case of non-use of the device head 1, i.e. when the hydraulic hose 48 is not connected. This plug 65 can furthermore be captively tied to the hose connection 58 via a band 66.

The above explanations serve to describe the inventions, which are captured by the application as a whole and which further develop the prior art at least by means of the following feature combinations, in each case also independently, wherein two, several, or all of these feature combinations can also be combined, namely:

A device head, which is characterized in that the second tool 5 can be moved between an initial position and an operating end position by means of the hydraulic piston 6, that the hydraulic piston 6 can act on a piston shaft 13, which is connected in one piece to a receptacle for the second tool 5, and that the piston shaft 13 can be received completely in the cylindrical formation 4 in the initial position.

A device head, which is characterized in that the device head 1 further has a toothing recess 8 formed integrally in one piece for the angularly fixed, but changeable arrangement of a retaining rod 9.

A device head, which is characterized in that in a longitudinal cross section of the device head 1, the toothing recess 8 is formed in a laterally offset manner, but in overlap to the cylindrical formation 4.

A device head, which is characterized in that the toothing recess 8 is formed concentrically circumferentially with respect to a central through opening 31.

A device head, which is characterized in that the second tool 5 can be moved between an initial position and an operating end position by means of the hydraulic piston 6, that the piston shaft 13 has a receptacle A, which, compared to the piston shaft 13, is enlarged transversely to a direction of movement d of the hydraulic piston 6 and which is assigned to the second tool 5, and that in the operating end position the receptacle A is held transversely to the direction of movement d in an undercut 63 formed on the device head 1.

A device head, which is characterized in that the receptacle A for the second tool 5 and the piston shaft are formed in one piece.

A device head, which is characterized in that in the initial position, the receptacle A is displaceable transversely to the direction of movement d for the assembly and disassembly.

A device head, which is characterized in that the device head 1 is connected to a hydraulic hose 48, which, for the free movability of the device head 1 as compared to a hydraulic aggregate 47 generating a hydraulic pressure, is connected to the hydraulic aggregate 47 on the other end.

A device head, which is characterized in that the device head 1 is rigidly connected to a body casting tool part 49, in which the hydraulic aggregate is arranged.

A device head, which is characterized in that the second tool 5 can be moved between an initial position and an operating end position by means of the hydraulic piston 6, and that the hydraulic piston 6 is received completely in the cylindrical formation 4 in the initial position.

A device head, which is characterized in that based on the initial position of the hydraulic piston 6 in continuation of a direction of movement d of the hydraulic piston 6 from the operating end position into the initial position outside of the region surrounding the hydraulic piston 6, the cylindrical formation 4 has a connector receptacle 39 for the body casting tool part 49 or the hydraulic hose 48.

A device head, which is characterized in that the connector receptacle 39 has a free inner diameter a, which is larger than the diameter b of the cylindrical formation 4 in a region, in which the cylindrical formation 4 surrounds the hydraulic piston 6 in the initial position.

A device head, which is characterized in that the hydraulic piston 6 consists of a piston shaft 13 and a cover part 20 arranged on the end facing away from the second tool 5.

A device head, which is characterized in that over a portion of its length, the piston shaft 13 is formed as hollow cylinder 23.

A device head, which is characterized in that a clamping screw 21 retains the cover part 20 by passing through the hollow cylinder 23.

A device head, which is characterized in that an adapter part 40 can be arranged on the connector receptacle 39, and that a piston bottom 26 is located opposite a piston-side front surface of the adapter part 40 in the initial position.

All of the disclosed features (alone, but also in combination with one another) are essential for the invention. The disclosure content of the corresponding/enclosed priority documents (copy of the prior application) is hereby also included in its entirety into the disclosure of the application, also for the purpose of adding features of these documents in claims of the present application. With their features, the subclaims, also without the features of a referenced claim, characterize independent inventive further developments of the prior art, in particular in order to file divisional applications on the basis of these claims. The invention specified in each claim can additionally have one or more of the features specified in the above description, in particular provided with reference numerals and/or specified in the list of reference numerals. The invention also relates to designs, in the case of which individual features, which are mentioned in the above description, are not realized, in particular insofar as they are discernibly expendable for the respective intended purpose or can be replaced by other means acting in a technically identical manner.

List of Reference Numerals

| | | | |
|---|---|---|---|
| 1 | device head | 29 | seal |
| 2 | counter holder | 30 | inner wall |
| 3 | first tool | 31 | passage opening |
| 4 | cylindrical formation | 32 | depression |
| 5 | second tool | 33 | retaining end |
| 6 | hydraulic piston | 34 | counter toothing recess |
| 7 | hydraulic cylinder | | |
| 8 | toothing recess | 35 | protrusion |
| 9 | retaining rod | 36 | threaded bore |
| 10 | connector leg | 37 | fixing screw |
| 11 | first tool carrier | 38 | handling knob |
| 12 | second tool carrier | 39 | connector receptacle |
| 13 | piston shaft | 40 | adapter part |
| 14 | retaining groove | 41 | adapter part wall |
| 15 | retaining screw | 42 | seal |
| 16 | stop | 43 | adapter part bottom |
| 17 | annular space | 44 | inflow opening |
| 18 | spring | 45 | adapter part connection |
| 19 | thrust washer | 46 | threaded pin |
| 20 | cover part | 47 | hydraulic aggregate |
| 21 | clamping screw | 48 | hydraulic hose |
| 22 | opening | 49 | body casting tool part |
| 23 | hollow cylinder | 50 | return valve |
| 24 | threaded bore | 51 | tank |
| 25 | piston wall | 52 | pumping plunger |
| 26 | piston bottom | 53 | hydraulic medium pump |
| 27 | depression | 54 | electric motor |
| 28 | screw head | 55 | accumulator |
| 56 | grip region | | |
| 57 | actuating button | | |
| 58 | hose connection | A | receptacle |
| 59 | front surface | M | device jaw |
| 60 | rear surface | W | tool |
| 61 | guide protrusion | | |
| 62 | guide groove | | |
| 63 | undercut | | |
| 64 | rib | α | angle |
| 65 | plug | | |
| 66 | band | | |
| 67 | T-head | | |
| 68 | T-web | | |
| 69 | groove base | | |
| b | inner diameter | | |
| c | direction | | |
| d | direction of movement | | |
| l | length | | |
| e | arrow | | |
| f | pull-out direction | | |
| X | hydraulic piston axis | | |
| y | retaining rod longitudinal axis | | |
| z | pivot axis | | |

The invention claimed is:

1. Device head of a hydraulically actuatable tool, comprising a counter holder, which is formed integrally in one piece on the device head and which has a receptacle for a first tool, and comprising a second tool, which can be moved towards the counter holder by a hydraulic piston, wherein a cylindrical formation likewise integrally in one piece with the device head with respect to the hydraulic piston is provided, wherein further the second tool can be moved between an initial position and an operating end position by the hydraulic piston, wherein the hydraulic piston can act on a piston shaft, which is connected in one piece to a receptacle for the second tool, and the piston shaft can be received completely in the cylindrical formation in the initial position, wherein furthermore the counter holder molds a first tool carrier, and a second tool carrier, which is formed in one piece and of uniform material with the piston shaft extending in the cylindrical formation, can be moved towards the first tool carrier, wherein the tool carrier forms a receptacle for the second tool, which is preferably retained in a replaceable manner, characterized in that the second tool carrier is formed in an essentially elongated rectangular manner with respect to a cross section transversely to a hydraulic piston axis, that longitudinal outer edges, which in the use state run perpendicular, are formed in an elongated rectilinear manner, while shorter outer edges viewed transversely thereto are in each case guided along a curved line, and that this curved line has a common radius, which refers to the axis, wherein a radius dimension is adapted to a diameter dimension of a surrounding jacket wall of the cylindrical formation.

2. The device head according to claim 1, wherein the device head further has a toothing recess formed integrally in one piece for the angularly fixed, but changeable arrangement of a retaining rod.

3. The device head according to claim 2, wherein in a longitudinal cross section of the device head, the toothing recess is formed in a laterally offset manner, but in overlap to the cylindrical formation.

4. The device head according to claim 2, wherein the toothing recess is formed concentrically circumferentially with respect to a central through opening.

5. The device head according to claim 1, wherein the second tool can be moved between an initial position and an operating end position by the hydraulic piston, that the piston shaft has a receptacle, which, compared to the piston shaft, is enlarged transversely to a direction of movement of the hydraulic piston and which is assigned to the second tool, and that in the operating end position the receptacle is held transversely to the direction of movement in an undercut formed on the device head.

6. The device head according to claim 1, wherein the receptacle for the second tool and the piston shaft are formed in one piece.

7. The device head according to claim 1, wherein in the initial position, the receptacle is displaceable transversely to the direction of movement for the assembly and disassembly.

8. The device head according to claim 1, wherein the device head is connected to a hydraulic hose, which, for the free movability of the device head as compared to a hydraulic aggregate generating a hydraulic pressure, is connected to the hydraulic aggregate on the other end.

9. The device head according to claim 1, wherein the device head is rigidly connected to a body casting tool part.

10. The device head according to claim 9, wherein the hydraulic aggregate is arranged in the body casting tool part.

11. The device head according to claim 1, wherein the second tool can be moved between an initial position and an operating end position by the hydraulic piston, and that the hydraulic piston is received completely in the cylindrical formation in the initial position.

12. The device head according to claim 1, wherein based on the initial position of the hydraulic piston in continuation of a direction of movement of the hydraulic piston from the operating end position into the initial position outside of the region surrounding the hydraulic piston, the cylindrical formation has a connector receptacle for the body casting tool part or the hydraulic hose.

13. The device head according to claim 12, wherein the connector receptacle has a free inner diameter, which is larger than the diameter of the cylindrical formation in a region, in which the cylindrical formation surrounds the hydraulic piston in the initial position.

14. The device head according to claim 12, wherein an adapter part can be arranged on the connector receptacle, and that a piston bottom is located opposite a piston-side front surface of the adapter part in the initial position.

15. The device head according to claim 1, wherein the hydraulic piston comprises a piston shaft and a cover part arranged on the end facing away from the second tool.

16. The device head according to claim 15, wherein over a portion of its length, the piston shaft is formed as hollow cylinder.

17. The device head according to claim 16, wherein a clamping screw retains the cover part by passing through the hollow cylinder.

* * * * *